(12) United States Patent
Kagawa et al.

(10) Patent No.: US 7,012,747 B2
(45) Date of Patent: Mar. 14, 2006

(54) POLARIZING BEAM SPLITTER AND POLARIZER USING THE SAME

(75) Inventors: Masaki Kagawa, Miyagi (JP); Toshio Sasaki, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/432,577

(22) PCT Filed: Sep. 20, 2002

(86) PCT No.: PCT/JP02/09728

§ 371 (c)(1),
(2), (4) Date: May 23, 2003

(87) PCT Pub. No.: WO03/027730

PCT Pub. Date: Apr. 3, 2003

(65) Prior Publication Data

US 2004/0051947 A1    Mar. 18, 2004

(30) Foreign Application Priority Data

Sep. 25, 2001   (JP)   ............................. 2001-292249
Aug. 15, 2002   (JP)   ............................. 2002-237050

(51) Int. Cl.
*G02B 27/28* (2006.01)
*G02B 5/30* (2006.01)

(52) U.S. Cl. .................. 359/487; 359/495; 359/496; 359/583

(58) Field of Classification Search ............... 359/487, 359/590, 494–496, 485, 583, 837; 313/499
See application file for complete search history.

(56) References Cited

U.S. PATENT DOCUMENTS 4,659,178 A * 4/1987 Kyogoku ................. 359/590

(Continued)

FOREIGN PATENT DOCUMENTS

JP           10-282340        10/1998

(Continued)

*Primary Examiner*—Leonidas Boutsikaris
(74) *Attorney, Agent, or Firm*—Sonnenschein, Nath & Rosenthal LLP

(57) ABSTRACT

There are provided an inexpensive polarizing beam splitter having a polarized light beam separating function of a wide range with a simple film construction and a reduced number of laminated film layers, and a polarizer provided with the polarizing beam splitter to arrange natural light into a specific polarized state.

A polarizing beam splitter 1 is constructed including a polarized light beam separation film 2: in which a first polarized light beam L1 of a light L0 incident at a predetermined angle is transmitted and a second polarized light beam L2 of the incident light L0 is reflected in a direction different from the above transmitted direction, having any structure of $(H2L)^m$, $(H2L)^m H$, and $2L(H2L)^m$ (where m is an integer 3 or more) , each of which is a repeated structure of a basic structure film H2L that, when $\lambda_0$ represents a reference wavelength of 550 nm of the incident light, is constructed of a high refractive-index layer H and low refractive-index layer L each of which has an optical film thickness approximately equal to $\lambda_0/4$; and transparent substrates 3A, 3B disposed on the light-entering surface 2A side and on the light-outgoing surface 2B side of the above film 2, respectively. Also, a polarizer is constructed being provided with the above polarizing beam splitter 1 and is formed by alternately laminating the polarized light beam separation film and transparent substrate to be obliquely cut out.

5 Claims, 22 Drawing Sheets

U.S. PATENT DOCUMENTS

| | | | |
|---|---|---|---|
| 4,966,438 A | * | 10/1990 | Mouchart et al. ............ 359/495 |
| 5,453,859 A | * | 9/1995 | Sannohe et al. ................ 349/9 |
| 5,808,795 A | * | 9/1998 | Shimomura et al. ......... 359/488 |
| 5,912,762 A | * | 6/1999 | Li et al. ...................... 359/352 |
| 5,967,635 A | * | 10/1999 | Tani et al. ..................... 353/20 |
| 6,014,255 A | * | 1/2000 | Van Der Wal et al. ...... 359/487 |
| 6,404,125 B1 | * | 6/2002 | Garbuzov et al. ........... 313/499 |
| 6,480,330 B1 | * | 11/2002 | McClay et al. .............. 359/359 |
| 6,623,121 B1 | * | 9/2003 | Sato ............................. 353/20 |
| 6,791,750 B1 | * | 9/2004 | Masubuchi et al. ......... 359/487 |

FOREIGN PATENT DOCUMENTS

| | | | |
|---|---|---|---|
| JP | 11-64630 | | 3/1999 |
| JP | 411064630 A | * | 3/1999 |
| JP | 2000-111730 | | 4/2000 |

* cited by examiner

POLARIZING BEAM SPLITTER AND POLARIZER USING THE SAME

TECHNICAL FIELD

The present invention relates to a polarizing beam splitter in which a polarized light beam separation film is disposed between a plurality of transparent substrates, and a polarizer provided with the polarizing beam splitter to arrange a natural light into a specific polarized state.

BACKGROUND OF THE INVENTION

An ordinary ray of light is neither in a completely polarized state nor in a completely non-polarized state, and various states including the both states coexist. In order to obtain a specific polarized state from among those states, various types of polarizers have hitherto been studied.

As the above-described polarizers, there are, for example, a birefringent polarizer that utilizes double refraction of a crystal, a dichroic polarizer that utilizes optical dichroism of high polymer molecule, a reflective polarizer that utilizes a reflected light of an S-polarized light, and the like.

As an optical element having a function of the above types of polarizer, there is known a polarizing beam splitter (PBS) in which, for example, a polarized light separation element transmitting therethrough a P-polarized light which is a first polarized light of an incident light entering at a predetermined angle, and reflecting an S-polarized light, which is a second polarized light, in a direction different from that of the transmission is constructed to be held between transparent substrates such as glass substrates.

Regarding the polarizing beam splitter (PBS), a lot of literatures concerned therewith are known, and, for example, an explanation is given of the polarizing beam splitter on pages 302 to 309 in "Light/Thin-Film Technique Manual, enlarged and revised edition" (published by The Optoronics Co., Ltd. in 1992).

In the above-described literature, there is shown a thin-film laminated type polarized light separation element constructed by alternately laminating a high refractive-index layer made of a high refractive-index material and a low refractive-index layer made of a low refractive-index material. That thin-film laminated type polarized light separation element utilizes optical single-axis anisotropy that occurs when two kinds of thin films (high refractive-index layer and low refractive-index layer) whose refractive indexes are different from each other and whose thickness are sufficiently small compared to the wavelength of light have been alternately laminated.

Regarding the thin-film laminated type polarized light separation element, when it is assumed that $\lambda_0$ represents a reference wavelength of 550 nm of the incident light, L represents the low refractive-index layer having an optical film thickness of $\lambda_0/4$ (the optical film thickness: the refractive index×the thickness), and H represents the high refractive-index layer having an optical film thickness of $\lambda_0/4$, the above-described literature gives a designing guideline that is expressed as the following formulas (1), (2) or the like.

$$(HL)^m \quad (1)$$

$$(0.5HL0.5H)^m \quad (2)$$

where m is an arbitrary positive integer.

Also, the 0.5H represents a high refractive-index layer having an optical film thickness ($\lambda_0/8$) that is 0.5 time as great as that of the high refractive-index layer H having a thickness of $\lambda_0/4$.

In each of the above formulas (1) and (2), m is conventionally set to 4 or more.

The above-described thin-film laminated type polarized light beam separation element utilizes the difference in non-transmission range between the P-polarized light and S-polarized light when the light was made to obliquely enter.

Then, the polarized light beam separation element having the high refractive-index layer H and low refractive-index layer L repeatedly laminated is held by the transparent substrates to form a rectangular parallelepiped shape, thereby constructing a polarizing beam splitter.

A cross section of a conventional thin-film laminated prism polarizing beam splitter (PBS) is illustrated in FIG. 25.

In a polarizing beam splitter 50, a polarized light beam separation element 52 is constructed by alternately laminating the high refractive-index layer H and low refractive-index layer L repeatedly, and is held by transparent substrates 51 on both sides of the polarized light beam separation element 52.

The P-polarized light is transmitted through the polarized light beam separation element 52 as it is, while the S-polarized light is reflected by the polarized light beam separation element 52 and goes out obliquely downwards as shown in the figure.

Also, particularly, the beam splitter in which the angle of incidence upon the polarized light beam separation element is adjusted to be 45 degrees and the reflected S-polarized light goes out at an angle of 90 degrees with respect to the incidence direction is called "a rectangular prism PBS".

FIG. 26 is a schematic construction view of a rectangular prism PBS 60.

A polarized light beam separation element 62 having a similar laminated structure to that of the polarized light beam separation element 52 illustrated in FIG. 25 is held by transparent substrates 61 from both sides thereof to construct the polarizing beam splitter (PBS) 60. Incident light enters the polarized light beam separation element 62 at an angle of incidence of 45 degrees with respect to the polarized light beam separation element 62, and an S-polarized light goes out downwards as shown in the figure at an angle of 90 degrees with respect to the incidence direction.

Hereupon, in the polarizing beam splitter using the above-described thin-film laminated type polarized light beam separation element, it is preferable that the angle of incidence of the incident light upon the polarized light beam separation element be set to a specific angle, mainly to an angle of 45 degrees (as shown in FIG. 26).

However, in that case, in order to satisfy desired characteristics, it is required to form a film having 30 layers or more as a multiple-layer film constituting the polarized light beam separation element, and as a result, the total film thickness becomes as thick as 4 μm or more.

Also, although the basic pattern in which the high refractive-index layer and low refractive-index layer are repeated is simple, practically the film thickness of each layer needs to be multiplied by a coefficient to be minutely adjusted.

Such multiple-layer film is difficult to manufacture and has a problem that it is impossible to be supplied cheaply.

Further, the manufacturing cost also increases.

Here, under the assumption that $TiO_2$ is employed as the high refractive-index material for the high refractive-index layer H and $SiO_2$ is employed as the low refractive-index material for the low refractive-index layer L, respectively, the calculated results of the polarized light beam separation characteristics of the polarized light beam separation film in which the number m that represents repetitions of time is set to m=4 to have a construction $(HL)^4$, are shown in FIG. 24.

Then, as a standard, when it is assumed that the range satisfying the transmittance Tp of the P-polarized light being Tp≧90% and the transmittance Ts of the S-polarized light being Ts≦10% be regarded as a range in which the polarized light is sufficiently split (hereinafter called "the polarized light separable region"), as shown in FIG. 24, the bandwidth corresponding to the polarized light-separable region is from 380 nm to 540 nm, i.e. has a value of approximately 160 nm, and is not very wide.

Further, when a conventional optical glass of n=1.52 is, for example, employed as the transparent substrate with respect to the polarized light beam separation film having the above construction, the polarized light beam separation film exhibits optimum polarized light beam separation characteristics at an angle of incidence of about 58 degrees, and when the angle of incidence is 45 degrees, the film does not exhibit optimum polarized light beam separation characteristics.

Accordingly, it is understood that, when the polarized light beam separation film of the $(HL)^4$ structure is constructed to be used, it becomes difficult to construct a high-performance PBS.

In order to solve the above-described problems, the present invention provides an inexpensive polarizing beam splitter having a function of splitting polarized light beam of the wide range with a simple film construction and a reduced number of laminated film layers, and a polarizer provided with the polarizing beam splitter to arrange natural light into a specific polarized state.

SUMMARY OF THE INVENTION

A polarizing beam splitter according to the present invention is the polarizing beam splitter in which a first polarized light beam of light entering at a predetermined angle is transmitted and a second polarized light beam of the entered light is reflected in a direction different from the direction in which the first polarized light beam is transmitted; having a polarized light beam separation film that includes a basic structure film H2L consisting of an optically transparent high refractive-index layer H having a predetermined refractive index with respect to the incident light and an optically transparent low refractive-index layer L having a refractive index lower than that of the high refractive-index layer H, that is formed of a multiple-layer film having a construction of any of $(H2L)^m$, $(H2L)^mH$, and $2L(H2L)^m$ (where m is an integer 3 or more) each of which is a repeated structure of the basic structure film, and in which when it is assumed that $\lambda_0$ represents a reference wavelength of 550 nm of the incident light, the high refractive-index layer H and low refractive-index layer L each has the optical film thickness approximately equal to $\lambda_0/4$; and having transparent substrates disposed on the light-entering surface side and on the light-outgoing surface side of the polarized light beam separation film, respectively.

A polarizer according to the present invention is the polarizer provided with a polarizing beam splitter: in which a first polarized light beam of light entering at a predetermined angle is transmitted and a second polarized light beam of the entered light is reflected in a direction different from the direction in which the first polarized light beam is transmitted; having a polarized light beam separation film that includes a basic structure film H2L consisting of an optically transparent high refractive-index layer H having a predetermined refractive index with respect to the incident light and an optically transparent low refractive-index layer L having a refractive index lower than that of the high refractive-index layer H, that is formed of a multiple-layer film having a construction of any of $(H2L)^m$, $(H2L)^mH$, and $2L(H2L)^m$ (where m is an integer 3 or more) each of which is a repeated structure of the basic structure film, and in which when it is assumed that $\lambda_0$ represents a reference wavelength of 550 nm of the incident light, the high refractive-index layer H and low refractive-index layer L each has the optical film thickness approximately equal to $\lambda_0/4$; and having transparent substrates disposed on the light-entering surface side and on the light-outgoing surface side of the polarized light beam separation film, respectively, and the polarizer is formed by alternately laminating the polarized light beam separation film and transparent substrate to be obliquely cut out.

According to the above-described construction of the polarizing beam splitter of the present invention, since the polarized light beam separation film consists of a multiple-layer film having any of the structure of $(H2L)^m$, $(H2L)^mH$, and $2L(H2L)^m$, each of which is a structure including a repeated structure $(H2L)^m$ (where m is an integer equal to or greater than 3) of the basic structure film H2L, using the high refractive-index layer H and low refractive-index layer L each of which has an optical film thickness approximately equal to $\lambda_0/4$, it becomes possible to obtain sufficient polarized light beam separation characteristics over a wide range of a wavelength.

According to the above-described construction of the polarizer of the present invention, since the polarizer is provided with the above-described polarizing beam splitter of the present invention and is formed by alternately laminating the polarized light beam separation film and transparent substrate to be obliquely cut out, sufficient polarized light beam separation characteristics are obtained over a wide range of a wavelength through the function of the above-described polarizing beam splitter of the present invention and, therefore, natural light can be efficiently arranged into a specific polarized state.

BRIEF DESCRIPTION OF DRAWINGS

FIG. 21 are characteristic curves illustrating the polarized light separation characteristics in the $(H2L)^4H$ structure when $ZrO_2$ is used as the material for the high refractive-index layer and $MgF_2$ is used as the material for the low refractive-index layer; and of those figures, FIG. 21A is a characteristic curve illustrating the distribution of the transmittance with respect to wavelength while

DETAILED DESCRIPTION OF THE PRESENTLY PREFERRED EMBODIMENTS

Figure 1:
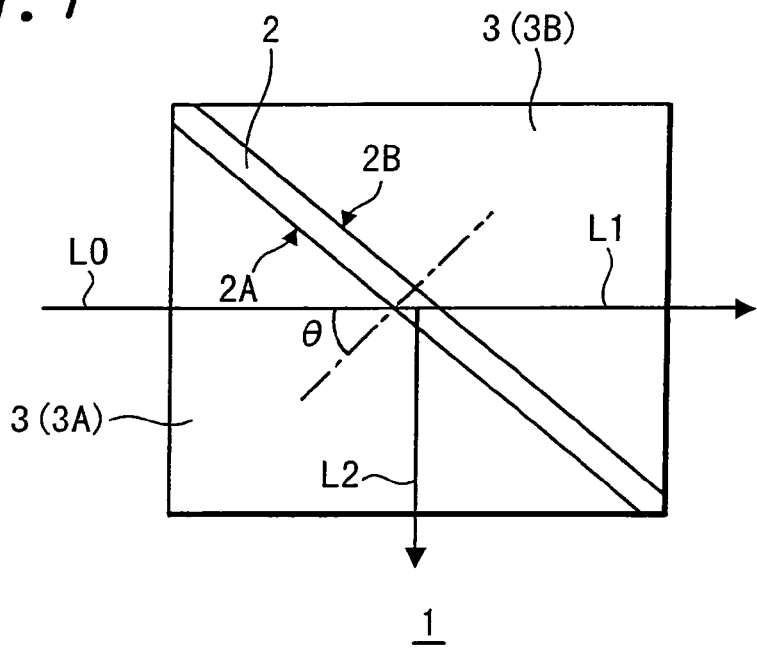
FIG. 1 is a schematic construction view of a polarizing beam splitter (an enlarged view in the proximity of a polarized light separation film) according to an embodiment of the present invention.

The present invention provides a polarizing beam splitter in which a first polarized light beam of light entering at a predetermined angle is transmitted and a second polarized light beam of the entered light is reflected in a direction different from the direction in which the first polarized light beam is transmitted; having a polarized light beam separation film that includes a basic structure film H2L consisting of an optically transparent high refractive-index layer H having a predetermined refractive index with respect to the incident light and an optically transparent low refractive-index layer L having a refractive index lower than that of the high refractive-index layer H, that is formed of a multiple-layer film having a construction of any of $(H2L)^m$, $(H2L)^mH$, and $2L(H2L)^m$ (where m is an integer 3 or more) each of which is a repeated structure of the basic structure film, and in which when it is assumed that $\lambda_0$ represents a reference wavelength of 550 nm of the incident light, the high refractive-index layer H and low refractive-index layer L each has the optical film thickness approximately equal to $\lambda_0/4$; and having transparent substrates disposed on the light-entering surface side and on the light-outgoing surface side of the polarized light beam separation film, respectively.

Further, according to the present invention, the above-described polarizing beam splitter has a construction in which the refractive index of the transparent substrate on the light-entering surface side and the refractive index of the transparent substrate on the light-outgoing surface side are selected such that when the angle of incidence of an incident light upon the polarized light beam separation film is an angle of 45 degrees, the polarized light beam can be sufficiently split.

Further, according to the present invention, the above-described polarizing beam splitter has a construction in which the high refractive-index layer H is formed of $TiO_2$ or $Nb_2O_5$ and the low refractive-index layer L is formed of $SiO_2$; m is an integer of 3 to 7; and the refractive index of the transparent substrate on the light-entering surface side and that on the light-outgoing surface side are both approximately from 1.75 to 1.8.

The present invention provides a polarizer provided with a polarizing beam splitter in which a first polarized light beam of light entering at a predetermined angle is transmitted and a second polarized light beam of the entered light is reflected in a direction different from the direction in which the first polarized light beam is transmitted; having a polarized light beam separation film that includes a basic structure film H2L consisting of an optically transparent high refractive-index layer H having a predetermined refractive index with respect to the incident light and an optically transparent low refractive-index layer L having a refractive index lower than that of the high refractive-index layer H, that consists of a multiple-layer film having a construction of any of $(H2L)^m$, $(H2L)^mH$, and $2L(H2L)^m$ (where m is an integer 3 or more) each of which is a repeated structure of the basic structure film, and in which when it is assumed that $\lambda_0$ represents a reference wavelength of 550 nm of the incident light, the high refractive-index layer H and low refractive-index layer L each has the optical film thickness approximately equal to $\lambda_0/4$; and having transparent substrates disposed on the light-entering surface side and on the light-outgoing surface side of the polarized light beam separation film, respectively, and the polarizer is formed by alternately laminating the polarized light beam separation film and transparent substrate to be obliquely cut out.

Further, according to the present invention, the above-described polarizer has a construction in which the high refractive-index layer H is formed of $TiO_2$ or $Nb_2O_5$ and the low refractive-index layer L is formed of $SiO_2$; m is an integer of 3 to 7; and the refractive index of the transparent substrate on the light-entering surface side and that on the light-outgoing surface side are both approximately from 1.75 to 1.8.

First, before describing a specific embodiment of the present invention, the outline of the present invention will be explained.

In the present invention, the H2L consisting of an optically transparent high refractive-index layer H having a predetermined refractive index with respect to the incident light and an optically transparent low refractive-index layer L having a refractive index lower than that of the high refractive-index layer H is adopted as a basic structure. When it is assumed that $\lambda_0$ represents a reference wavelength of 550 nm of the incident light, each of the high refractive-index layer H and low refractive-index layer L is set to have an optical thickness (the optical thickness or optical film thickness: the refractive index×the thickness) approximately equal to $\lambda_0/4$. Then, 2L represents the optical film thickness ($\lambda_0/2$) twice as thick as the $\lambda_0/4$.

Conventionally, the layer having an optical film thickness of $\lambda_0/2$ is called a spacer layer and has no effect upon a light whose wavelength is $\lambda_0$, and therefore the layer was not used in the conventional PBS film.

However, the inventors of this application have found that when the film thickness of the low refractive-index layer is positively set to $\lambda_0/2=2L$, the bandwidth in which light can be polarized and divided is greatly enlarged and have come to the achievement of the present invention.

Then, instead of the constructions shown in the above-described formulas (1) and (2), the polarized light beam separation film is made to have one of a construction shown in the following formula (3), a construction shown in the following formula (4), and a construction shown in the following formula (5).

$$(H2L)^m \tag{3}$$

$$2L(H2L)^m \tag{4}$$

$$(H2L)^mH \tag{5}$$

where m is an integer of 3 or more. Preferably m is set to an integer ranging from 3 to 7 such that the number of the layers does not become very large.

Further, the transparent substrates are each disposed on the light-entering side and on the light outgoing side to construct the polarizing beam splitter.

Conventionally, the polarized light beam separation film of the polarizing beam splitter is expected to have the optimum polarized light beam separation characteristics, when the angle of incidence is 45 degrees.

In the polarizing beam splitter that uses the polarized light beam separation film having the construction including the above-described $(H2L)^m$ structure (hereinafter referred to as "the $(H2L)^m$ structure"), in the case where $TiO_2$ is used as the material of the high refractive-index layer H, $SiO_2$ is used as the material of the low refractive-index layer L, and the most conventional white sheet of glass (e.g. the so-called "BK7", etc.) having the refractive index n=1.52 is used as the transparent substrate, the angle of incidence which provides the optimum polarized light beam separation characteristics becomes 56 degrees.

When the polarizing beam splitter having a construction that uses the transparent substrate having the refractive index n=1.52 is applied to the polarizer to arrange natural light into a specific polarized state, because it is necessary to make the angle of incidence upon the polarized light beam separation film as large as, for example, 56 degrees, there is the need to make the thickness of the polarizer thicker than that of a conventional one.

Therefore, the relationship with relevant optical components constituting the optical system inconveniently changes, with the result that the possibility that the compatibility between the polarizer and the conventional product will fail to come true becomes high.

The dependency upon the angle of incidence of the polarized light beam separation characteristics of the polarized light beam separation film (PBS film) in the polarizing beam splitter is especially dependent on the refractive index of the transparent substrate on the light-entering side.

In view of the above, in the present invention, in the polarizing beam splitter that uses the polarized light beam separation film having the $(H2L)^m$ structure, by further selecting the refractive index of the transparent substrate, sufficient polarized light beam separation can be obtained at the angle of incidence of 45 degrees, preferably the optimum polarized light beam separation characteristics to be obtained at the incident angle of 45 degrees.

Figure 23:
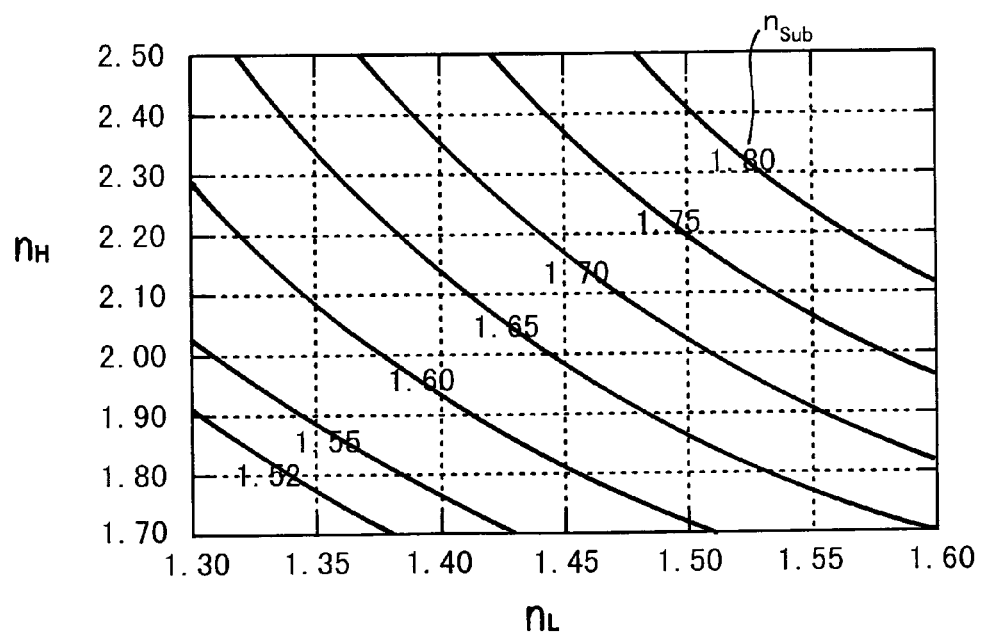
FIG. 23 is a diagram illustrating the relationship among the low refractive-index layer, high refractive-index layer, and transparent substrate to define the angle of incidence of 45 degrees.

Here, as illustrated in FIG. 23, it is known that there is the relationship between the refractive index $(n_{SUB})$ of the transparent substrate and those $(n_H, n_L)$ of the thin film materials to obtain the angle of incidence of 45 degrees (cited from "Design/Fabrication/Evaluation Technique of Optical Thin Film in the Production Field" pp. 253, published by Technology Information Association, 2001"). By referring to the relationship and, further, with the optical constants of the practical films taken into consideration, it is preferable to select a transparent substrate having an appropriate refractive index.

Conventionally, other optical glasses having various characteristics than the above-described white sheet of glass (BK7) having the refractive index n=1.52 are available, and the refractive index thereof covers a wide range of 1.44 to 2.05.

In the polarizing beam splitter that uses the polarized light beam separation film having the $(H2L)^m$ structure, the relationship between the refractive index of the transparent substrate and the incident angle providing optimum polarized light beam separation characteristic is that, as the refractive index of the transparent substrate increases, an optimum polarized light beam separation characteristic is provided at an acute (smaller) angle of incidence.

Then, in the case where $TiO_2$ (n=1.49: thickness=92.3 nm) is used as the material of the high refractive-index layer H and $SiO_2$ (n=2.40: thickness=57.3 nm) is used as the material of the low refractive-index layer L, when the refractive index n of the transparent substrate has been made approximately 1.75 to 1.8, optimum polarized light beam separation characteristics are obtained at the incident angle of 45 degrees.

As such transparent substrate, for example, a model number S-LAH52 of optical glass made by OHARA INC. or a model number NbFD12 of optical glass made by HOYA CORPORATION. corresponds.

Here, when, in the above combination of the materials, a conventional glass (whose refractive index is about 1.52) is adopted as the transparent substrate, the optimum angle of incidence upon the surface of the film for polarized light beam separation becomes approximately 56 degrees.

Any one of the following data samples illustrated in each of FIGS. 3 to 20, unless particularly specified, is the one that is calculated when the above combination of materials has been employed, that is, $SiO_2$ (n=1.49; L=92.3 nm) has been used as the material of the low refractive-index layer L and $TiO_2$ (n=2.40; H=57.3 nm) has been used as the material of the high refractive-index layer H, under the condition that the refractive index n of the transparent substrate is set to 1.8 and the angle of incidence is 45 degrees. It is assumed that each of those materials has no light absorption.

Here, comparison is made with respect to an $(LHL)^m$ structure having a similar structure to the above-described $(H2L)^m$ structure.

In the $(LHL)^m$ structure, it has a film structure of LH2LH2LH2L . . . H2LHL and therefore a main constituent element thereof is a repeated structure of (H2L).

Figure 3A:
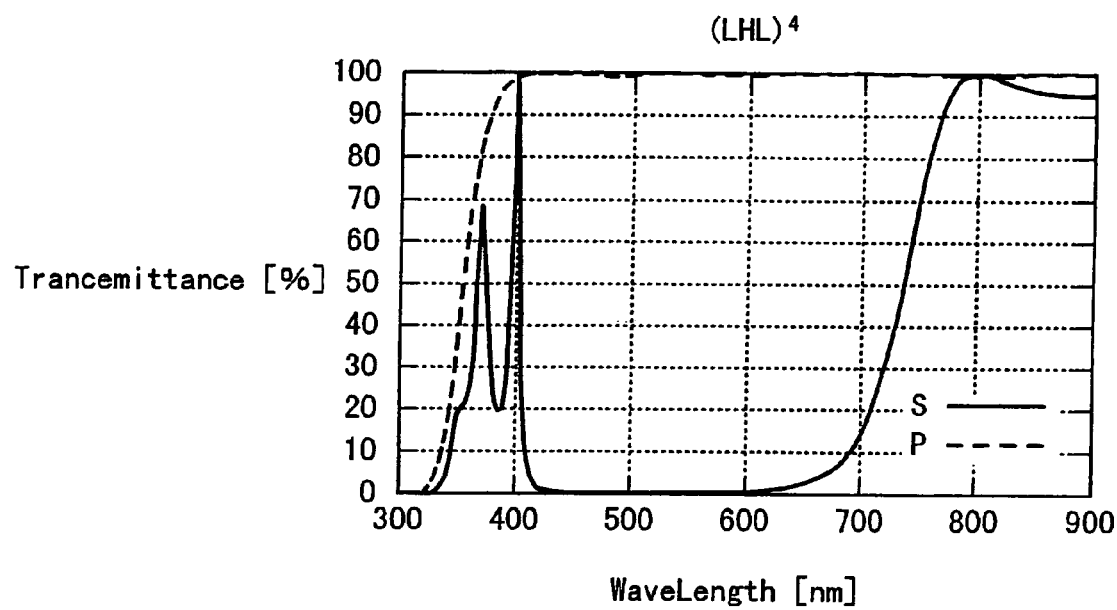
FIG. 3A is a characteristic curve illustrating distribution of the transmittance with respect to the wavelength in an $(LHL)^4$ structure.
Figure 3B:
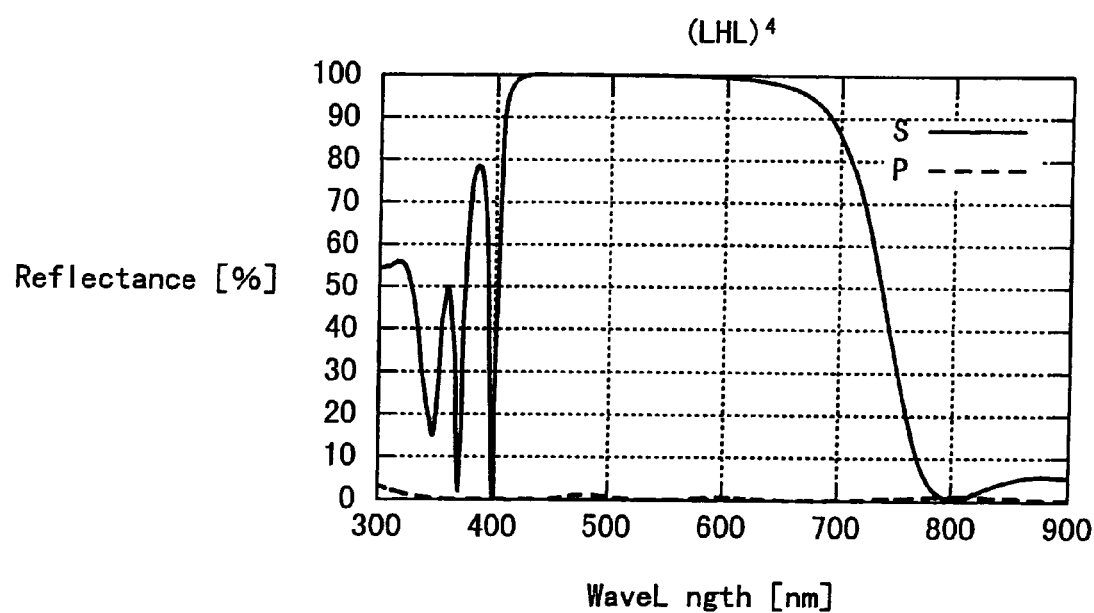
FIG. 3B is a characteristic curve illustrating distribution of the reflectance with respect the wavelength in the $(LHL)^4$ structure.
Figure 4A:
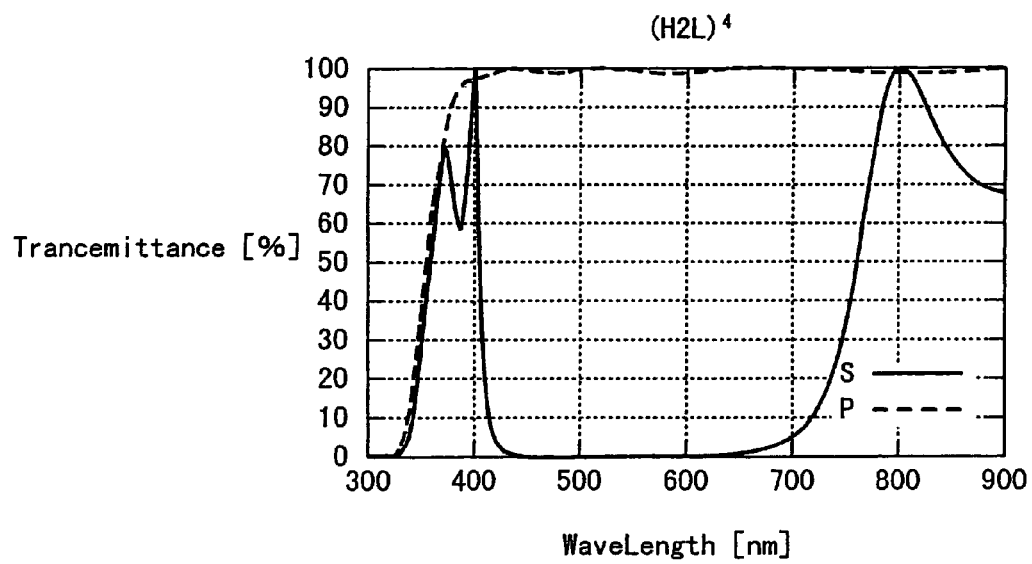
FIG. 4A is a characteristic curve illustrating distribution of the transmittance with respect to the wavelength in a $(H2L)^4$ structure.
Figure 4B:
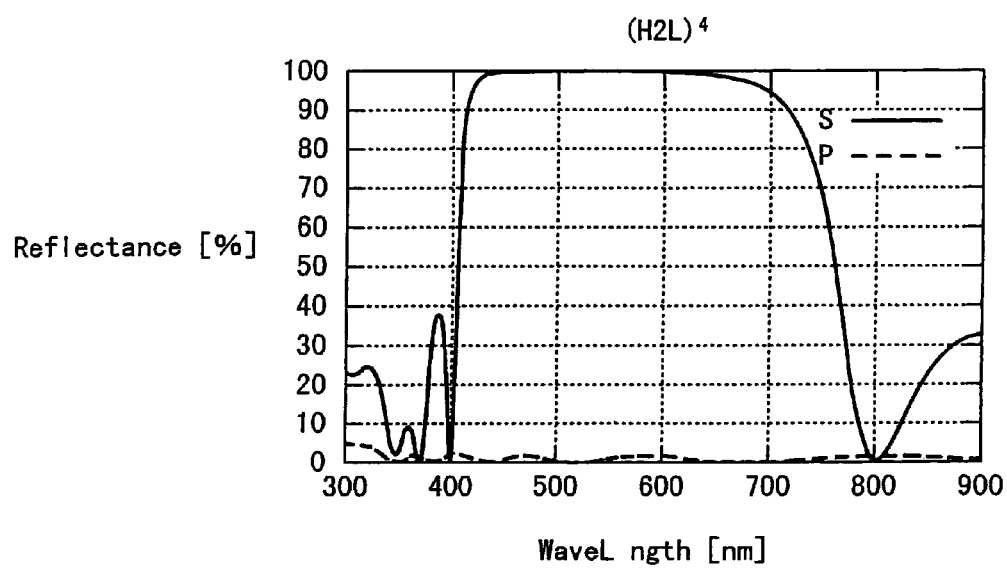
FIG. 4B is a characteristic curve illustrating distribution of the reflectance with respect to the wavelength in the $(H2L)^4$ structure.

For example, the following two constructions are compared and illustrated in FIGS. 3 and 4. FIGS. 3A and 4A illustrate distribution of the transmittance with respect to the wavelength while FIGS. 3B and 4B illustrate the reflectance thereof.

$(LHL)^4$=LH2LH2LH2LHL: nine layers (FIGS. 3A and 3B)

$(H2L)^4$=H2LH2LH2LH2L: eight layers (FIGS. 4A and 4B)

By comparing FIGS. 3 and 4, it is understood that those polarized light beam characteristics are almost the same.

Figure 24:
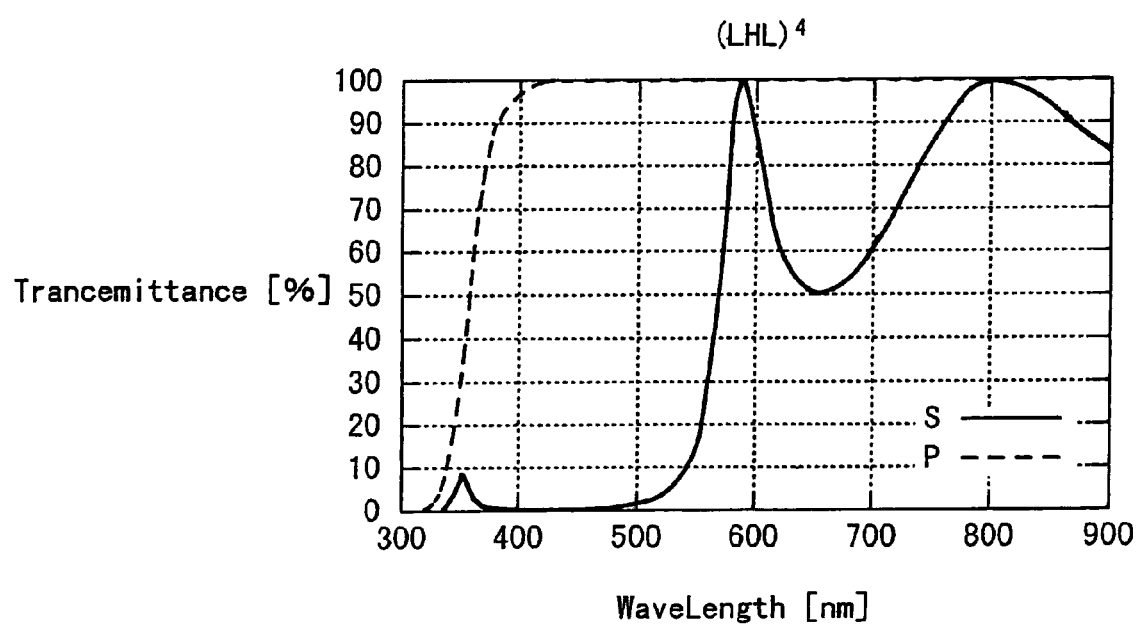
FIG. 24 is a characteristic curve illustrating distribution of the transmittance with respect to the wavelength in an $(HL)^4$ structure.
Figure 25:
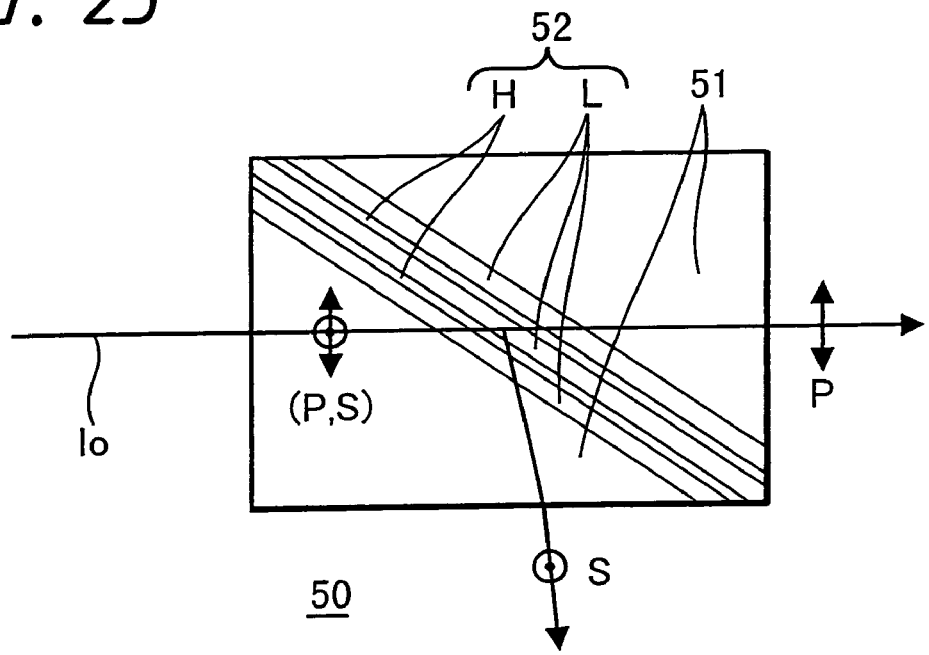
FIG. 25 is a schematic construction view of a thin-film laminated prism type polarizing beam splitter.
Figure 26:
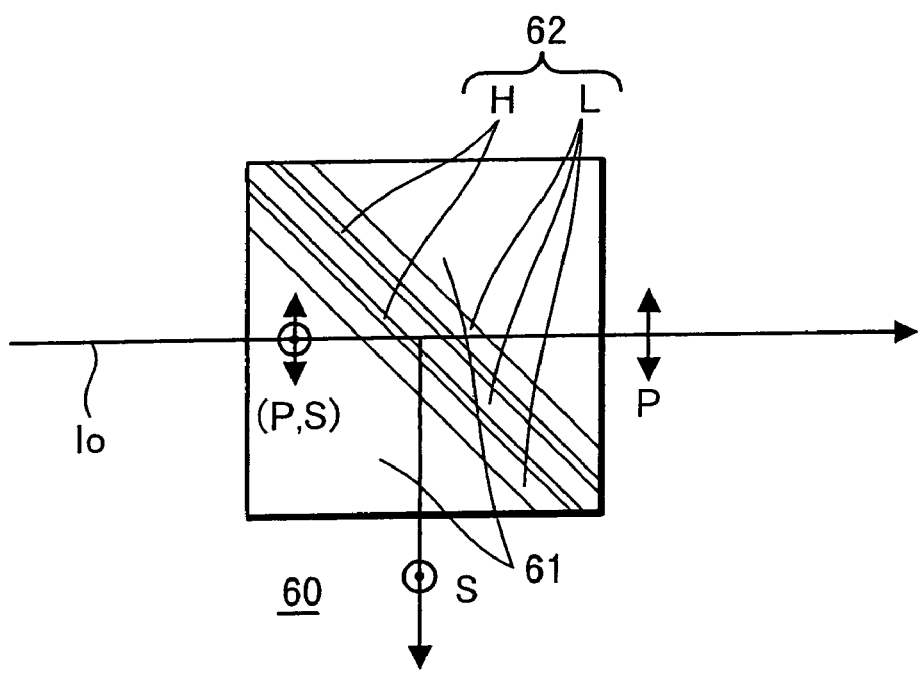
FIG. 26 is a schematic construction view of a rectangular prism type PBS.

Here, when FIG. 4A is compared with the FIG. 24 previously referred to, it is obvious that the range of a wavelength in which polarization separation can be made is greatly widened. Further, when the range of a wavelength that meets the requirement that the transmittance Tp of the P-polarized light be Tp≧90% and the transmittance Ts of the S-polarized light be Ts≦10% is determined, the wavelength ranges from 420 nm to 720 nm and has a bandwidth of approximately 300 nm, and it is understood that the range of a wavelength is approximately doubled.

Moreover, in order to provide a further symmetric $(H2L)^4$ structure, the polarized light beam separation film is made to have the following structure in which one 2L layer is removed. The distribution of the transmittance with respect to a wavelength in this case is illustrated in FIG. 5A while reflectance thereof is illustrated in FIG. 5B.

$(H2L)^3H$=H2LH2LH2LH: seven layers

Figure 5A:
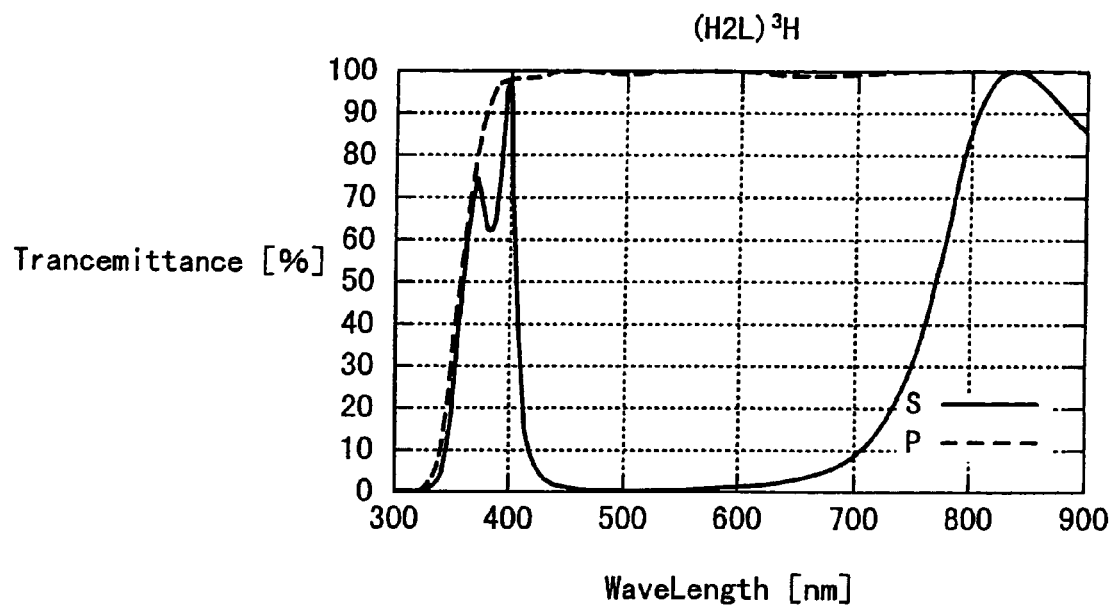
FIG. 5A is a characteristic curve illustrating distribution of the transmittance with respect to the wavelength in an $(H2L)^3H$ structure.
Figure 5B:
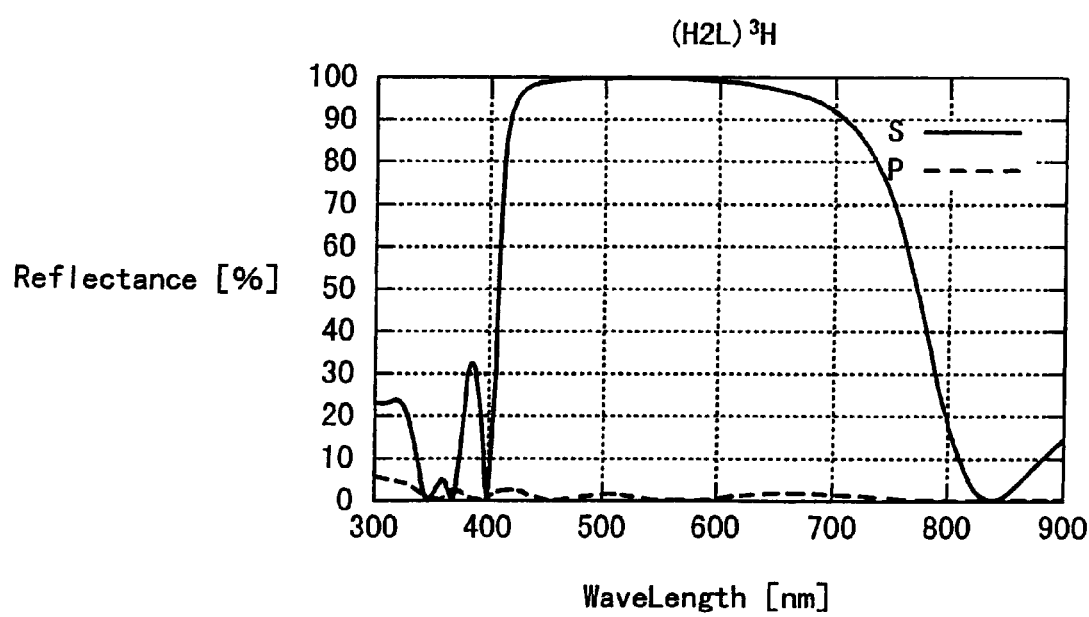
FIG. 5B is a characteristic curve illustrating distribution of the reflectance with respect to the wavelength in the $(H2L)^3H$ structure.

As shown in FIGS. 5A and 5B, even when the polarized light beam separation film has the $(H2L)^3H$ structure, the polarized light beam separation characteristics remain virtually unchanged.

This construction is advantageous to the extent of having one layer less than the $(H2L)^m$ structure.

Figure 6A:
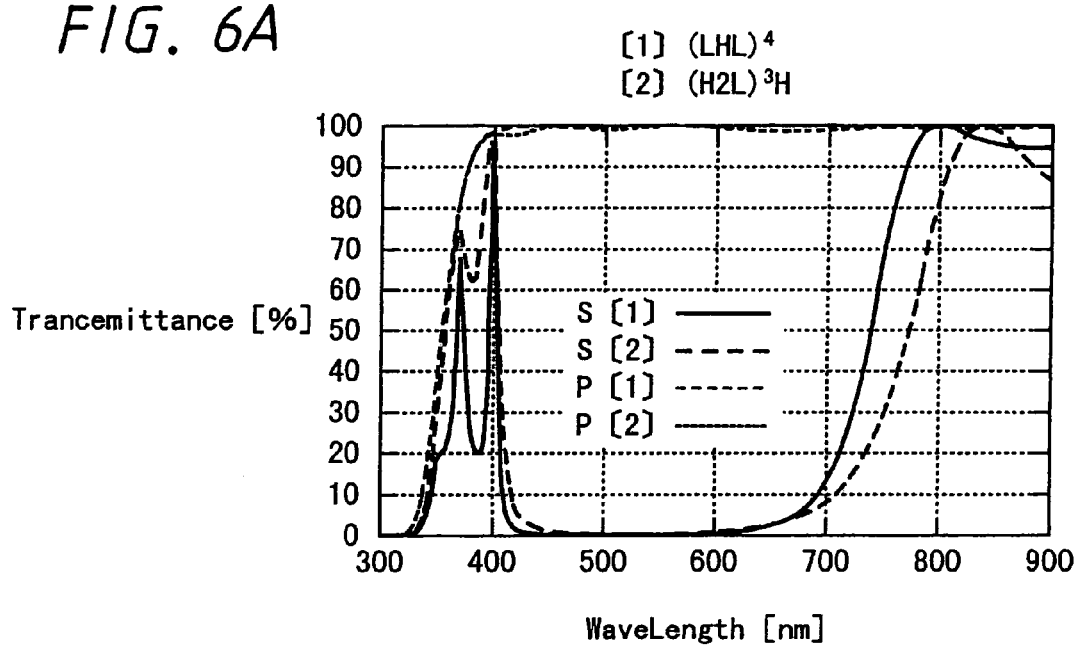
FIG. 6A is a characteristic curve illustrating distribution of the transmittance with respect to the wavelength in each of an $(LHL)^4$ structure and $(H2L)^3H$ structure by comparing the both with each other.
Figure 6B:
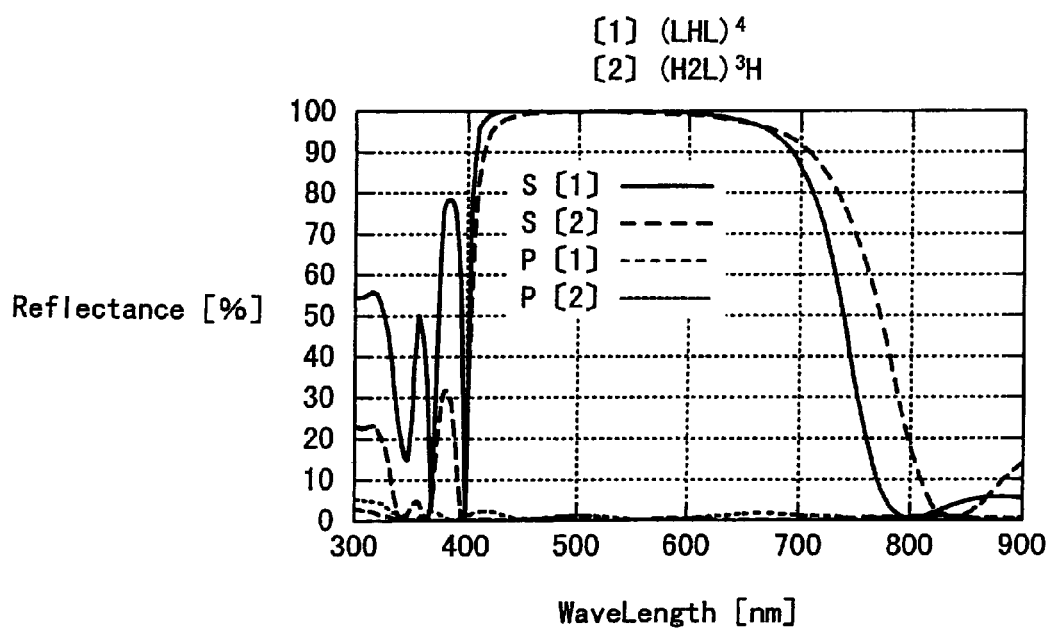
FIG. 6B is a characteristic curve illustrating distribution of the reflectance with respect to the wavelength in each of the $(LHL)^4$ structure and $(H2L)^3H$ structure by comparing the both with each other.

Here, the $(LHL)^4$ structure illustrated in FIGS. 4A and 4B, and the $(H2L)^3H$ structure illustrated in FIGS. 5A and 5B are illustrated in FIGS. 6A and 6B by comparing distribution of both structures in the same figures.

As shown in FIGS. 6A and 6B, although in the $(H2L)^3H$ structure slight deterioration is observed on the short wavelength side, on the long wavelength side the characteristics have a margin that is rather wide.

Namely, it can be verified that the $(H2L)^mH$ structure is superior to the $(LHL)^m$ structure.

Figure 7A:
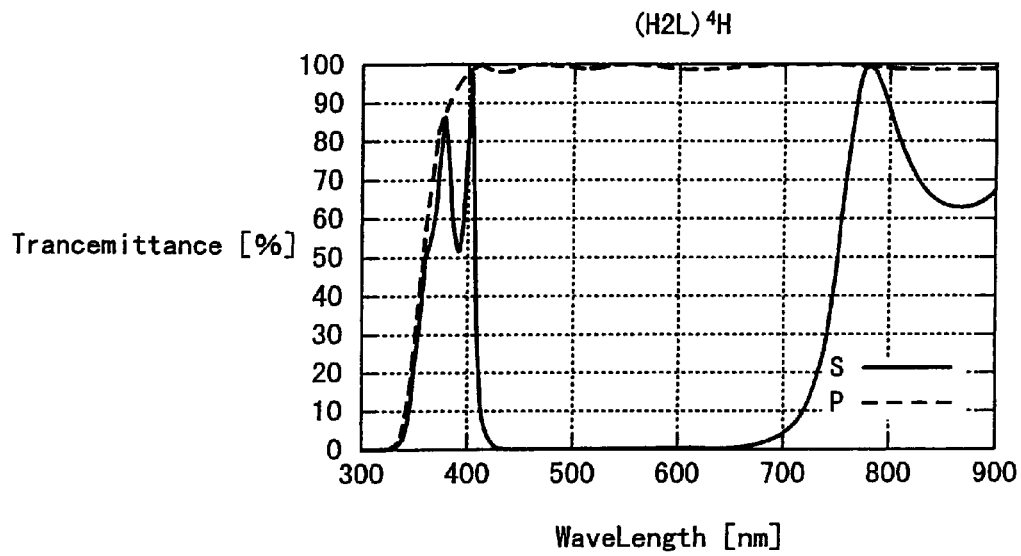
FIG. 7A is a characteristic curve illustrating distribution of the transmittance with respect to the wavelength in an $(H2L)^4H$ structure.
Figure 7B:
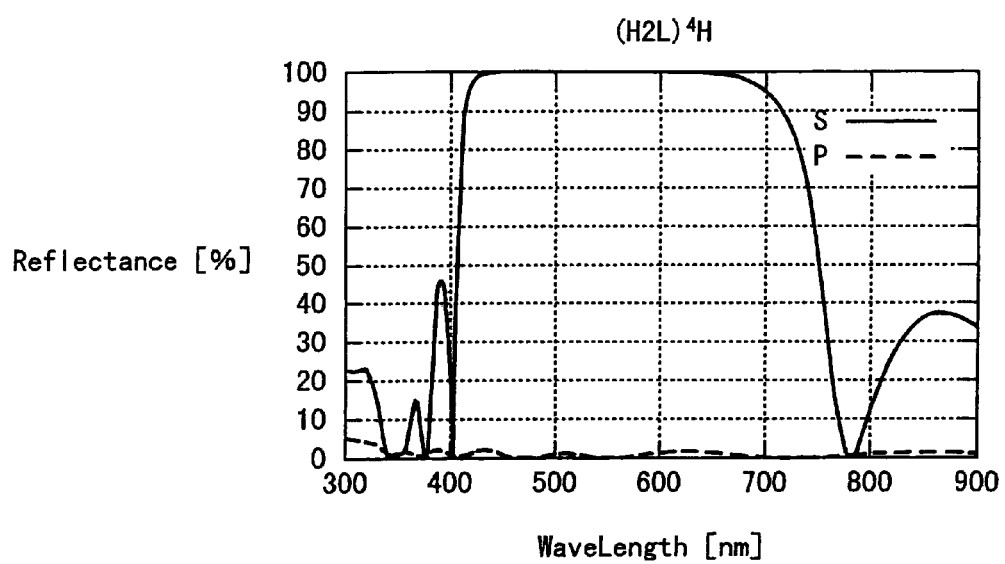
FIG. 7B is a characteristic curve illustrating distribution of the reflectance with respect to the wavelength in the $(H2L)^4H$ structure.

Further, in order to make the polarized light beam separation film have the same nine layers as those of the $(LHL)^4$ structure, an $(H2L)^4H$ structure is employed. The polarized light beam separation characteristics of the $(H2L)^4H$ structure are illustrated in FIGS. 7A and 7B. It is obvious by comparing FIGS. 3 and 7 that the $(H2L)^4H$ structure is superior to the $(LHL)^4$ structure in those characteristics.

On the other hand, the polarized light beam separation characteristic has been studied when the value m was made small.

Next, as shown in FIGS. 8 and 9, distribution of the transmittance and distribution of the reflectance with respect to a wavelength of the following $(H2L)^2H$ structure and $(H2L)^3$ structure have been studied.

Figure 8A:
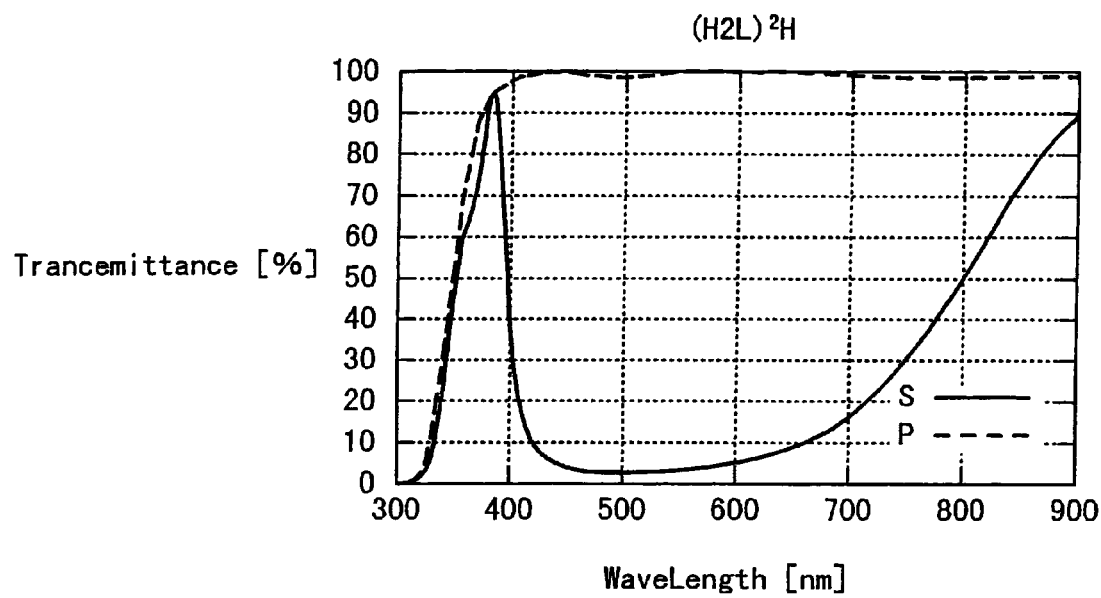
FIG. 8A is a characteristic curve illustrating distribution of the transmittance with respect to the wavelength in an $(H2L)^2H$ structure.
Figure 8B:
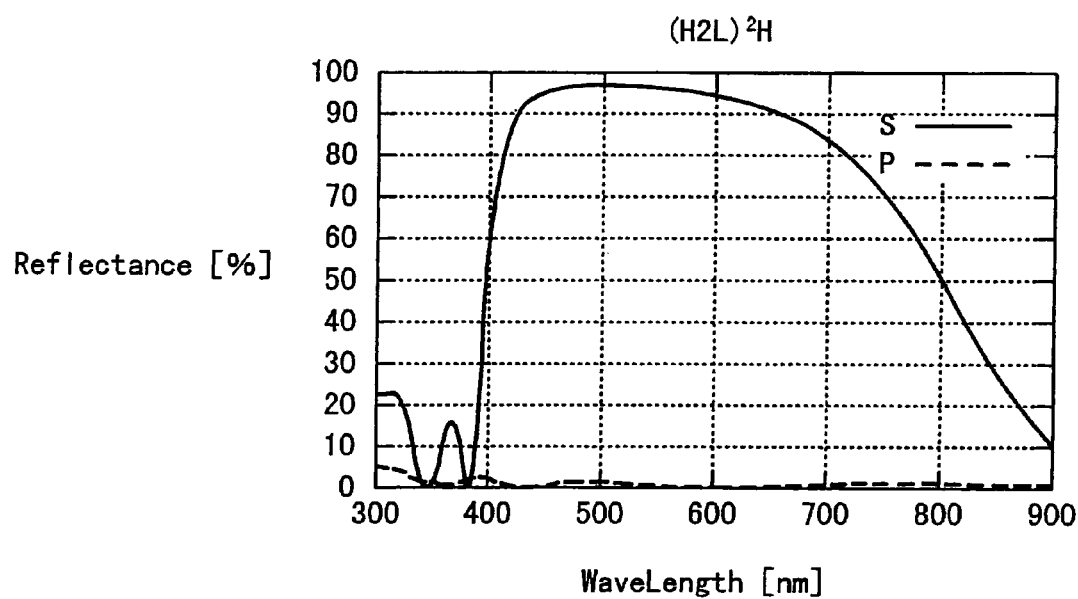
FIG. 8B is a characteristic curve illustrating distribution of the reflectance with respect to the wavelength in the $(H2L)^2H$ structure.

$(H2L)^2H$=H2LH2LH: five layers (FIGS. 8A and 8B)

Figure 9A:
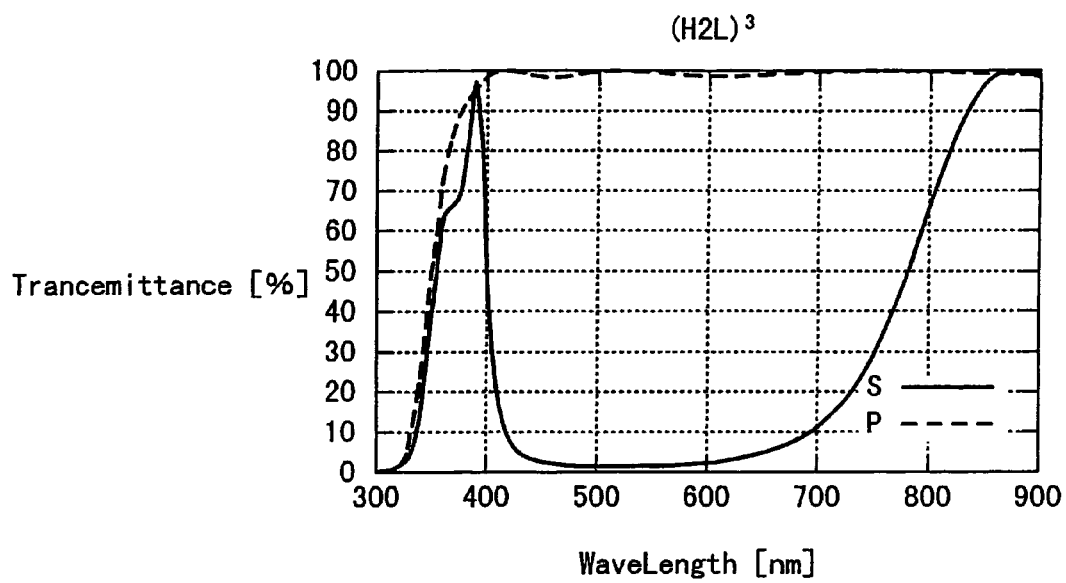
FIG. 9A is a characteristic curve illustrating distribution of the transmittance with respect to the wavelength in an $(H2L)^3$ structure.
Figure 9B:
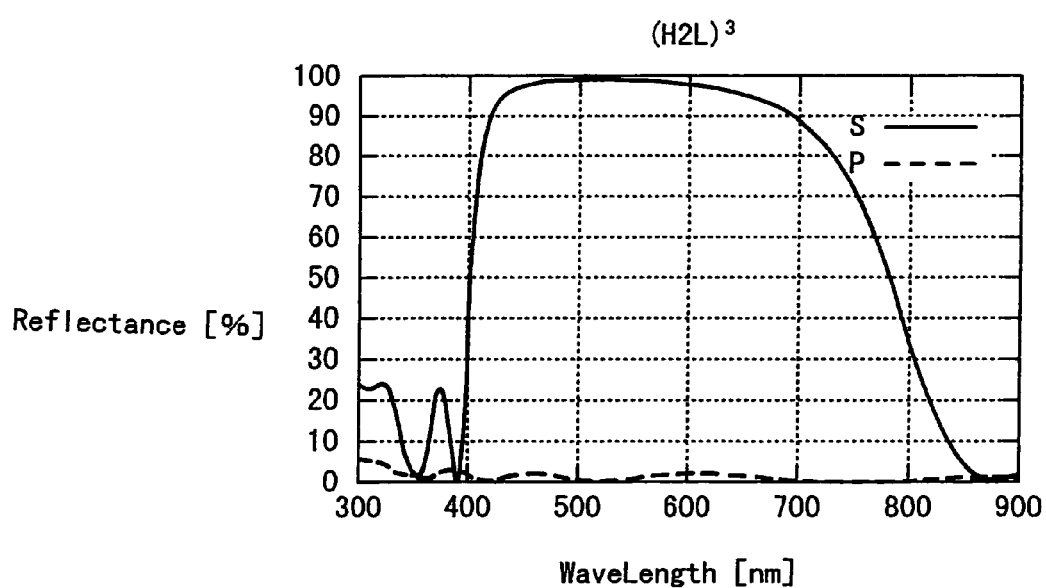
FIG. 9B is a characteristic curve illustrating distribution of the reflectance with respect to the wavelength in the $(H2L)^3$ structure.

$(H2L)^3$=H2LH2LH2L: six layers (FIGS. 9A and 9B)

As shown in FIGS. 8A and 8B, it is obvious that in the five-layer structure the separation of the S-polarized light is insufficient.

As shown in FIGS. 9A and 9B, in the six-layer structure the wavelength in which the S-polarized light transmits on the long wavelength side is slightly biased towards the short wavelength from a desirable value, and also though the minimum value of the transmittance does not become zero, the polarization separation is made barely possible.

Accordingly, it is verified that the lower limit of the value m is 3 from the practical point of view.

Next, the change in the polarized light beam separation characteristics with respect to the S-polarized light is studied when the value m has been increased.

Figure 10A:
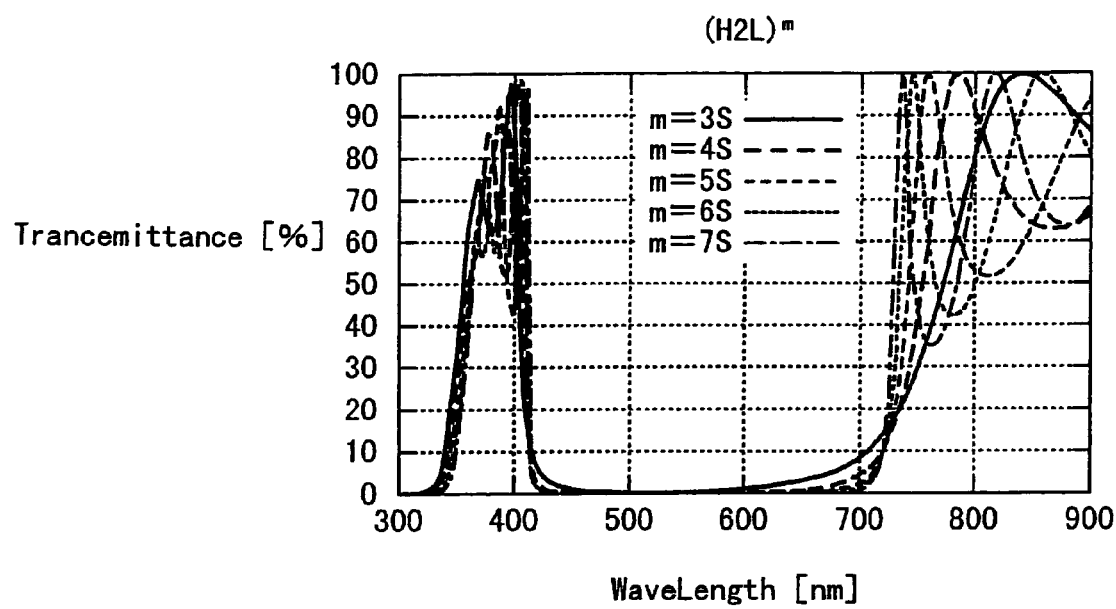
FIG. 10A is a characteristic curve illustrating the variation in distribution of the transmittance with respect to the wavelength when the value m is changed in an $(H2L)^m$ structure.
Figure 10B:
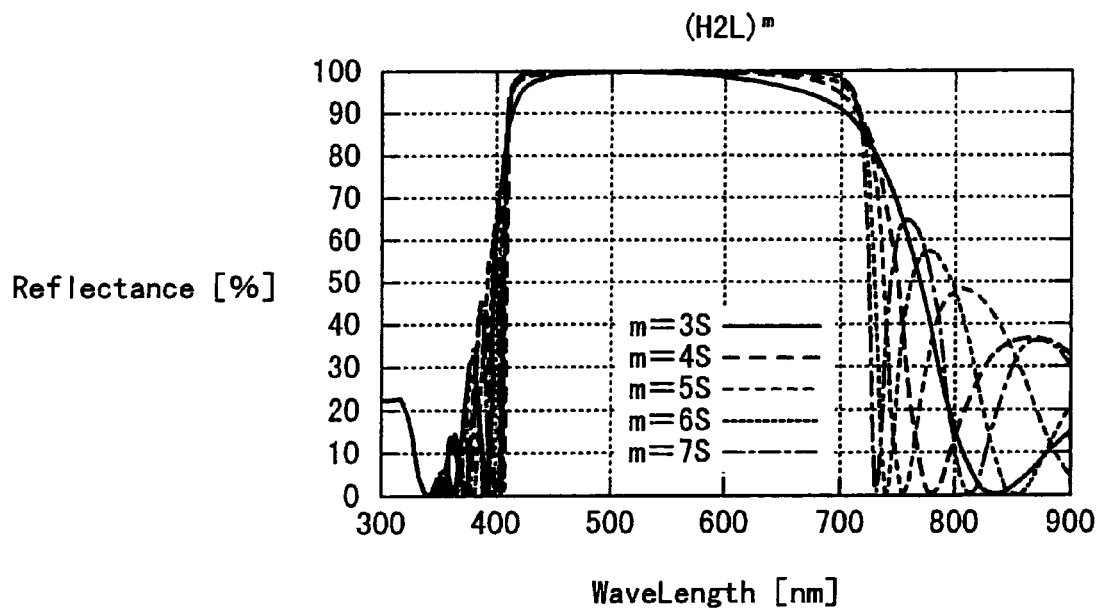
FIG. 10B is a characteristic curve illustrating the variation in distribution of the reflectance with respect to the wavelength when the value m is changed in the $(H2L)^m$ structure.

In FIGS. 10A and 10B, there are illustrated, respectively, the change in distribution of the transmittance with respect to the wavelength and the change in distribution of the reflectance thereof when m has been varied from 3 to 7 in the $(H2L)^m H$ structure.

As shown in FIGS. 10A and 10B, it is obvious that, as m increases, the both ends of reflection range in which the S-polarized light is reflected more sharply rise and fall, respectively. Also, it is obvious that no large fluctuations occur regarding the reflection bandwidth of the S-polarized light.

Accordingly, although m has no upper limit value to be considered, since the smaller the number of laminated layers of the polarized light beam separation film becomes, the more advantageous the film is for the production thereof, it is verified that sufficient range for m is from approximately 3 to 5.

Under the above condition, the repetition number m of the $(H2L)^m$ structure has been varied, and it has been studied how the P-polarized light transmittance Tp decreases. The result is shown in FIG. 11.

Figure 11:
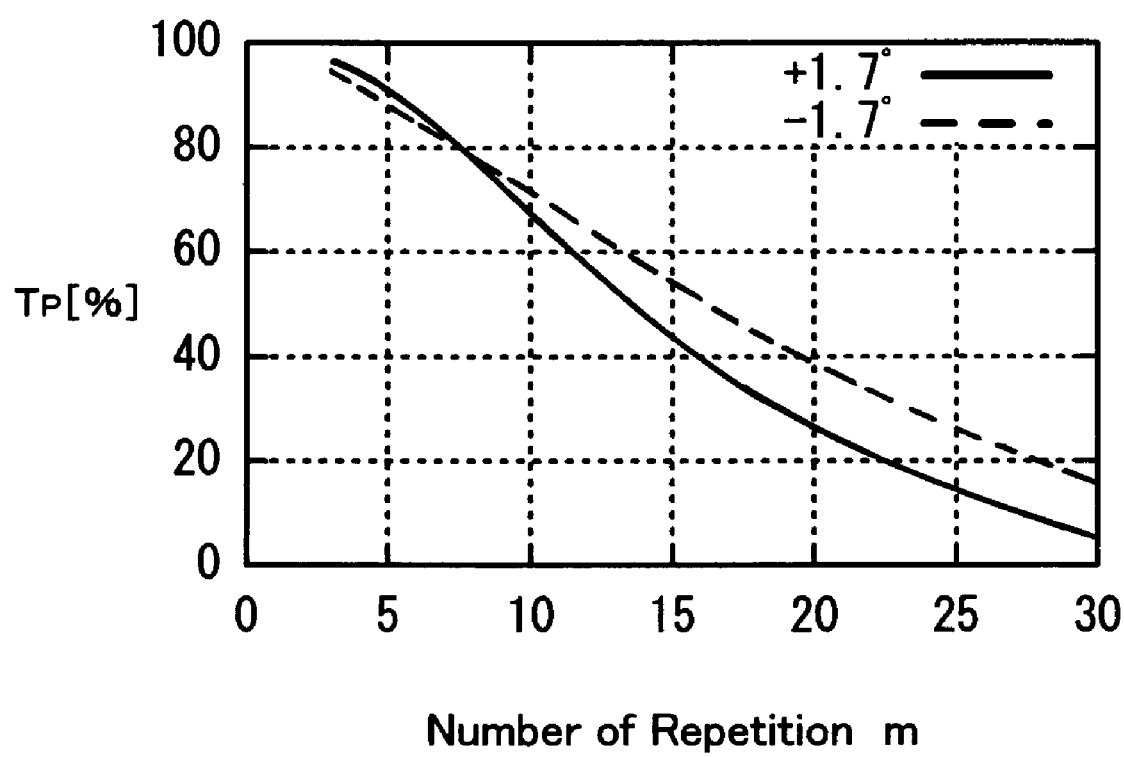
FIG. 11 is a characteristic curve illustrating the relationship between m of the repetition number and the transmittance of the P-polarized light in the case where the angle has been shifted.

As shown in FIG. 11, it is obvious that, as the repetition number m increases, the amount of the decline in the transmittance increases due to the angle of incidence being shifted, with the result that the dependency upon the angle deteriorates.

If the decrease in the transmittance of the P-polarized light is permitted up to approximately 80%, the upper limit of m becomes 7.

Meanwhile, as a structure, the $(H2L)^m H$ structure of (5) and $2L(H2L)^m$ structure of (4) each previously referred to are equivalent to each other.

Figure 12A:
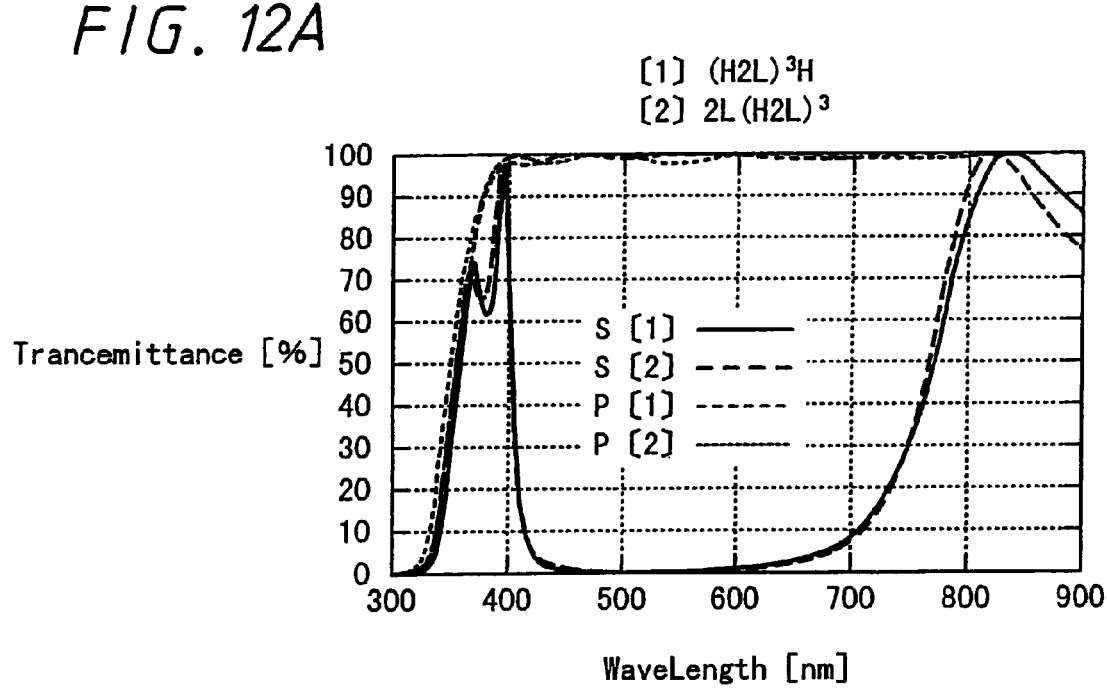
FIG. 12A is a characteristic curve illustrating distribution of the transmittance with respect to the wavelength in each of an $(H2L)^3H$ structure and $2L(H2L)^3$ structure by comparing the both with each other.
Figure 12B:
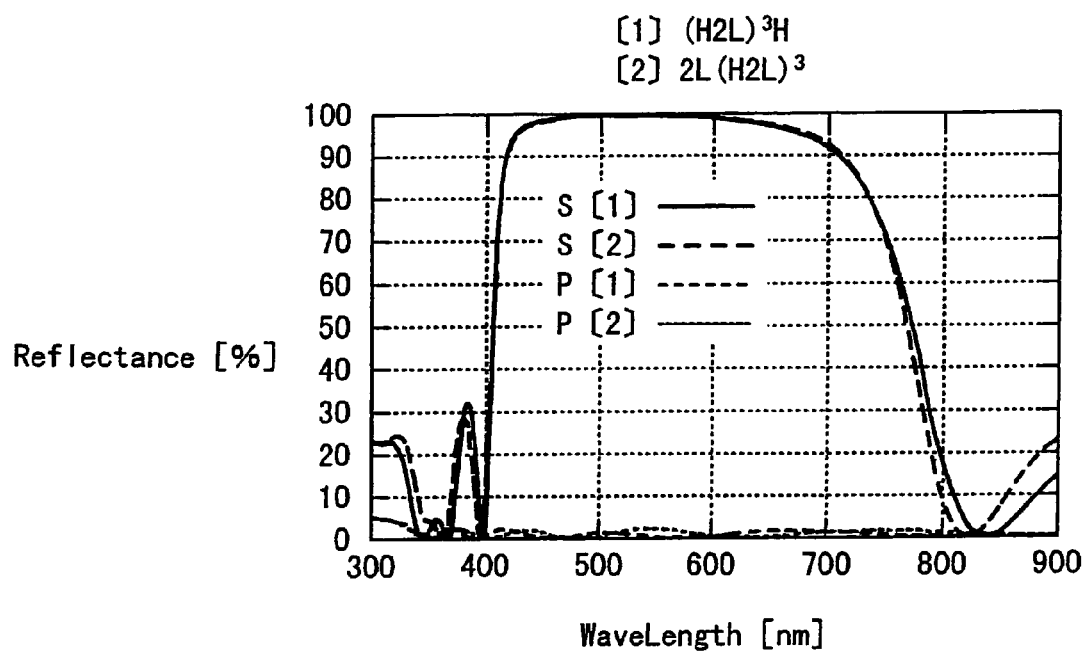
FIG. 12B is a characteristic curve illustrating distribution of the reflectance with respect to the wavelength in each of the $(H2L)^3H$ structure and $2L(H2L)^3$ structure by comparing the both with each other.

Here, the $(H2L)^3 H = H2LH2LH2LH$ and $2L(H2L)^3 = 2LH2LH2LH2L$ obtained when the value of m is set to be 3 are compared in the same figures and each illustrated in FIGS. 12A and 12B.

As shown in FIGS. 12A and 12B, it is obvious that the both structures have approximately the same polarized light beam separation characteristics.

The $(H2L)^3 H$ structure becomes approximately 120 nm thinner in terms of the total film thickness.

On the other hand, in the case where the film-forming speed of the low refractive-index layer L is four times or more higher than that of the high refractive-index layer H, it is possible to select the $2L(H2L)^3$ structure.

However, the dependency upon the angle of incidence is different between the both structures.

Figure 13A:
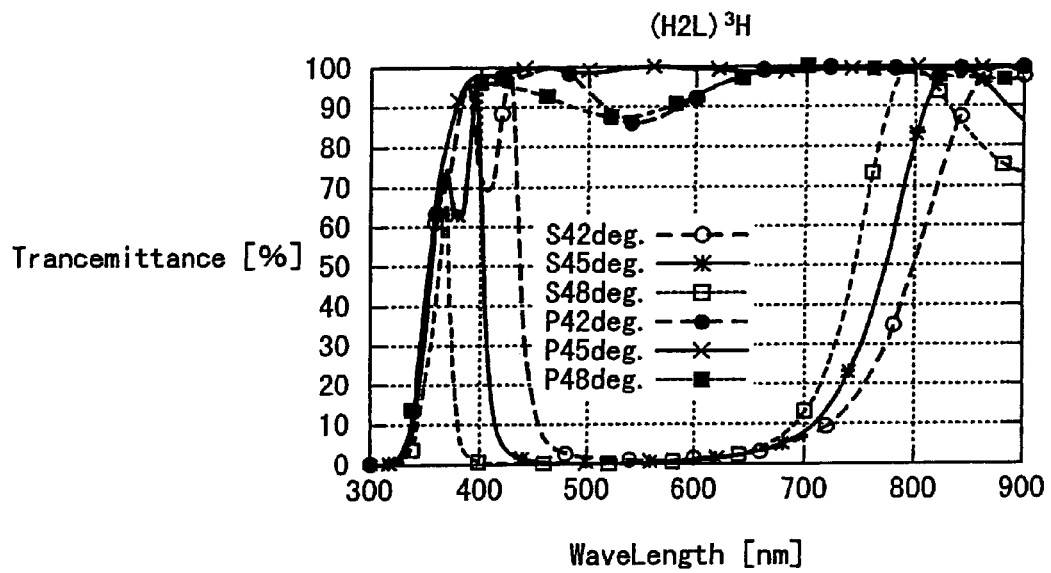
FIG. 13A is a characteristic curve illustrating the dependency on the angle of incidence of distribution of the transmittance with respect to the wavelength in the $(H2L)^3H$ structure.
Figure 13B:
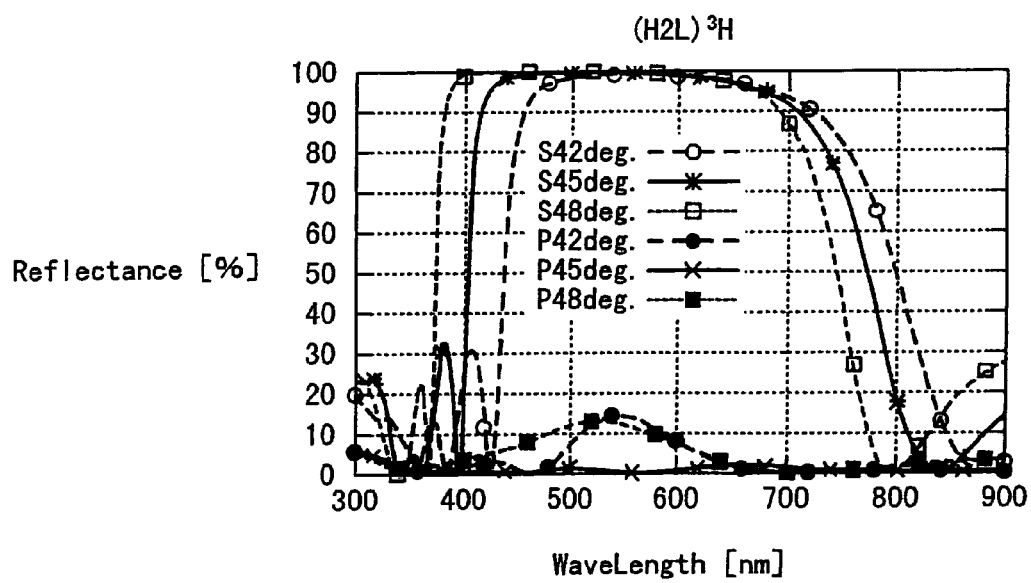
FIG. 13B is a characteristic curve illustrating the dependency on the angle of incidence of distribution of the reflectance with respect to the wavelength in the $(H2L)^3H$ structure.
Figure 14A:
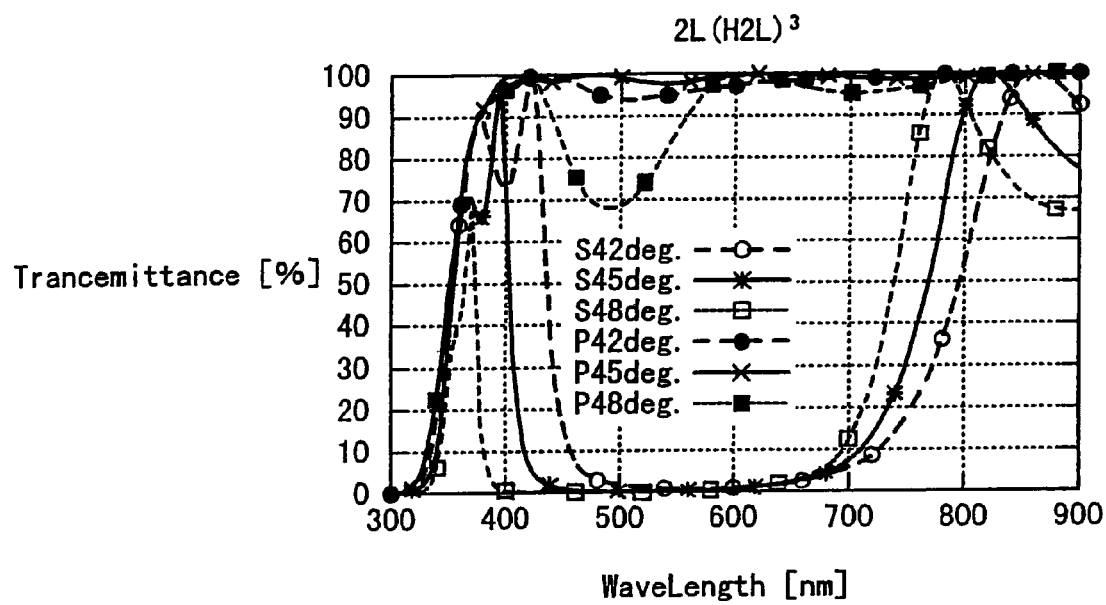
FIG. 14A is a characteristic curve illustrating the dependency on the angle of incidence of distribution of the transmittance with respect to the wavelength in the $2L(H2L)^3$ structure.
Figure 14B:
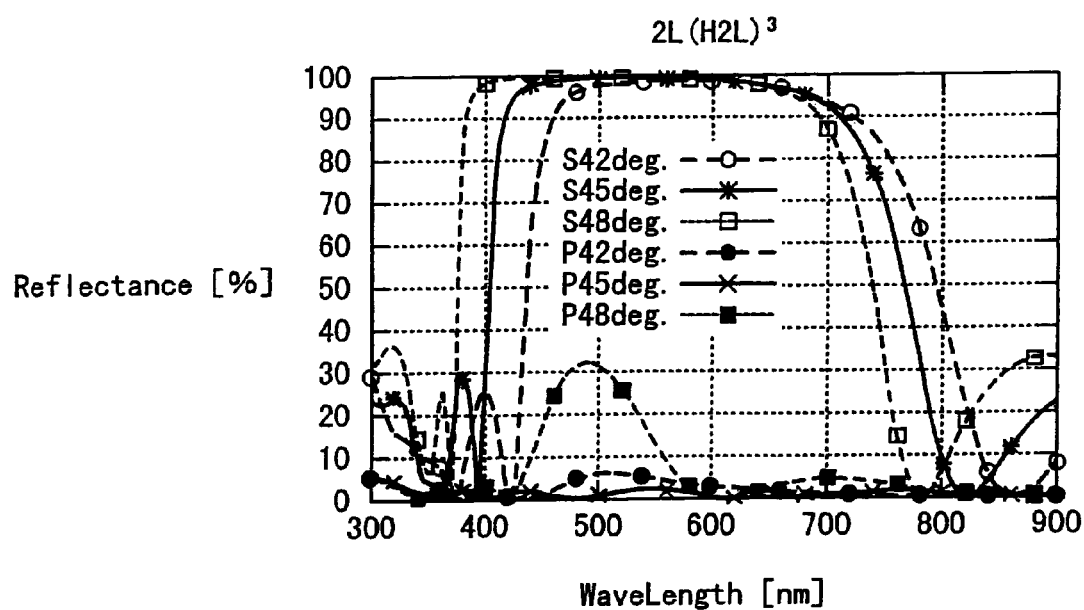
FIG. 14B is a characteristic curve illustrating the dependency on the angle of incidence of distribution of the reflectance with respect to the wavelength in the $2L(H2L)^3$ structure.

The changes in distributions of the transmittance and reflectance with respect to a wavelength when the angle of incidence has been varied about a 45 degrees angle within a range of ±3 degrees are illustrated in each of FIGS. 13A, 13B for the $(H2L)^3 H$ structure, and FIGS. 14A and FIG. 14B for the $2L(H2L)^3$ structure.

As shown in FIGS. 13A and 13B, in the $(H2L)^3 H$ structure, with respect to the change in the angle of incidence, the distributions symmetrically change on the + side where the angle of incidence increases and on the − side where the angle of incidence decreases.

In contrast, as shown in FIGS. 14A and 14B, in the $2L(H2L)^3$ structure, a small change occurs with respect to the incidence made on the − side and a large change occurs with respect to the incidence made on the + side.

Since it is desirable that the dependency upon the angle of incidence on the + side be symmetrical with that on the − side, it is understandable that the $(H2L)^m H$ structure is more convenient to use.

Figure 15A:
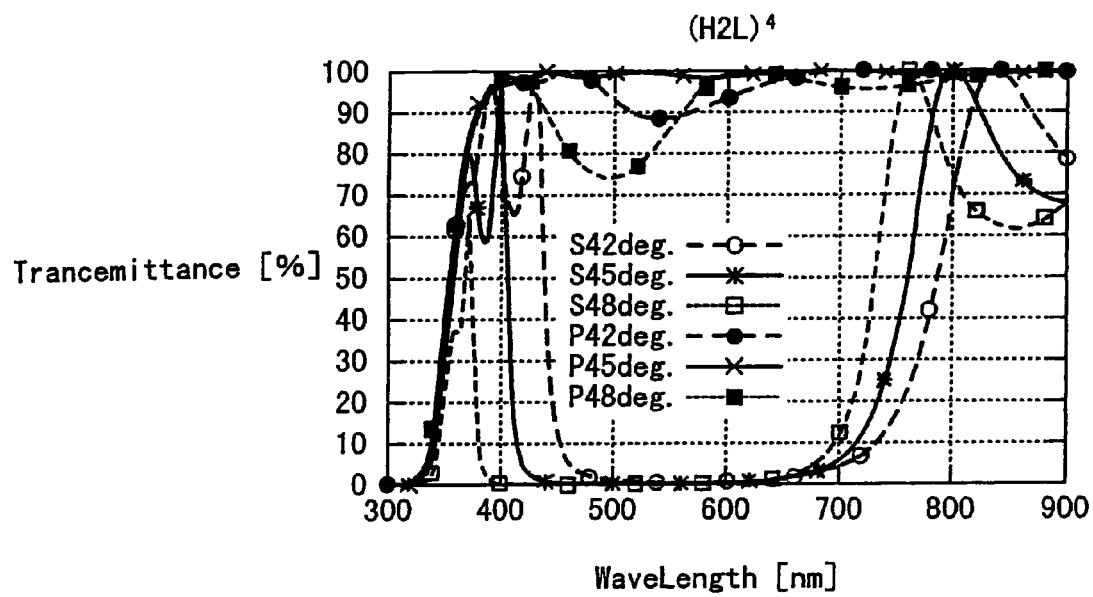
FIG. 15A is a characteristic curve illustrating the dependency on the angle of incidence of distribution of the transmittance with respect to the wavelength in an $(H2L)^4$ structure.
Figure 15B:
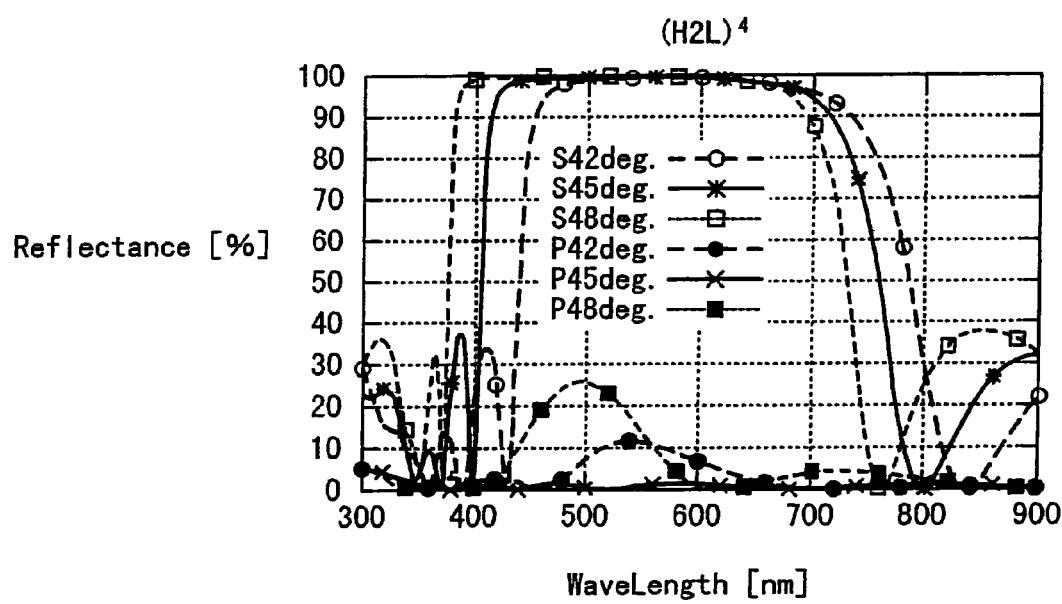
FIG. 15B is a characteristic curve illustrating the dependency on the angle of incidence of distribution of the reflectance with respect to the wavelength in the $(H2L)^4$ structure.
Figure 16A:
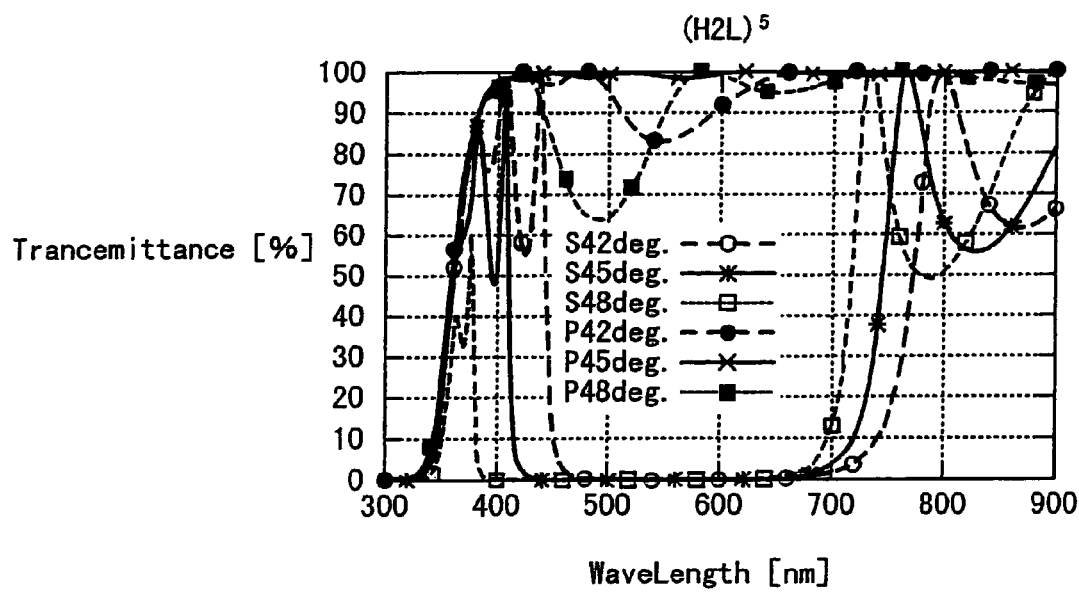
FIG. 16A is a characteristic curve illustrating the dependency on the angle of incidence of distribution of the transmittance with respect to the wavelength in an $(H2L)^5$ structure.
Figure 16B:
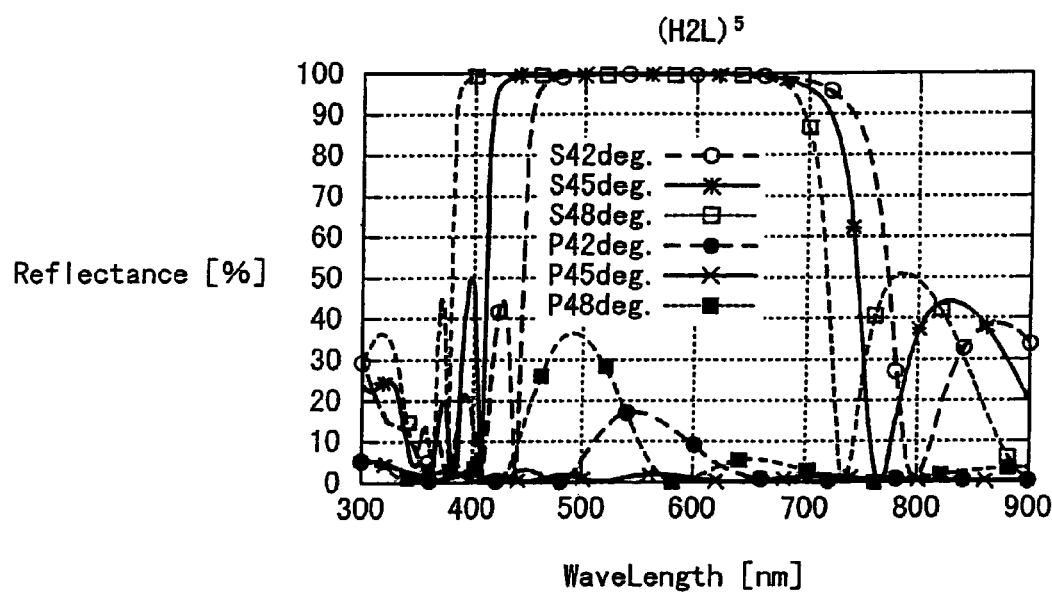
FIG. 16B is a characteristic curve illustrating the dependency on the angle of incidence of distribution of the reflectance with respect to the wavelength in the $(H2L)^5$ structure.

Next, the change in the dependency upon the angle of incidence of the transmittance and reflectance caused by the variation in the value m is studied The dependencies upon the angles of incidence of the transmittance and reflectance in the $(H2L)^4$ structure are illustrated in FIGS. 15A and 15B while those in the $(H2L)^5$ structure are illustrated in FIGS. 16A and 16B.

When FIGS. 15 and 16 are compared, it is obvious that the asymmetricity with respect to the angles of incidence is smaller in the eight-layer $(H2L)^4$ structure. That is to say, the structure having the small number of layers has the tendency of the asymmetricity being smaller, and therefore rather unaffected by the shift of the angle of incidence.

Based upon the result shown in the above-described FIGS. 13 to 16, the $(H2L)^m H$ structure can be practically the most convenient to use.

However, in the case where the stability of the high refractive-index layer H is not sufficient and a problem arises when the high refractive-index layer H is brought in contact with the transparent substrate, it is also necessary to consider disposing the low refractive-index layers L at the outermost layer on both sides of the laminated structure and using a structure in which the low refractive-index layer L is come in contact with the substrate on each side.

Conventionally, the polarized light beam separation film having a laminated structure is tend to be affected by the fluctuation in the angle of incidence. As shown in FIGS. 13 and 14, when the angle of incidence is shifted from an optimum angle, there occur unwanted effects such as the decline in transmittance of the P-polarized light that should originally be approximately 100%, the shift in the band of the polarized light beam separation, or the like. The amount of decrease in transmittance of the P-polarized light tends to increase as the number of layers laminated in the thin film increases. That determines the upper limit of the value m.

Also, the shifting of the angle in the air decreases at the point of time when the light has entered the transparent substrate of prism in accordance with the Snell's law. In this respect, it is understandable that it is more advantageous to use the transparent substrate having a higher refractive index. When, for example, the refractive index of the transparent substrate is assumed to be n=1.8, the shifting of the angle of ±3 degrees in the air results in the shifting of the angle of approximately ±1.7 degrees within the transparent substrate.

In order to move the band for the polarized light beam separation, each optical film thickness of the high refractive-index layer H and low refractive-index layer L only needs to be deviated (thinned or thickened) from ¼ of the reference wavelength $\lambda_0$=550 nm. Specifically, it is only needed to set a center wavelength λ instead of the reference wavelength $\lambda_0$ to obtain the optical thickness λ/4 from the center wavelength λ.

If the center wavelength λ is made short, the polarizing light beam separation band is shifted to the short wavelength side. If the center wavelength λ is made long, the polarizing light beam separation band is shifted to the long wavelength side.

Figure 17:
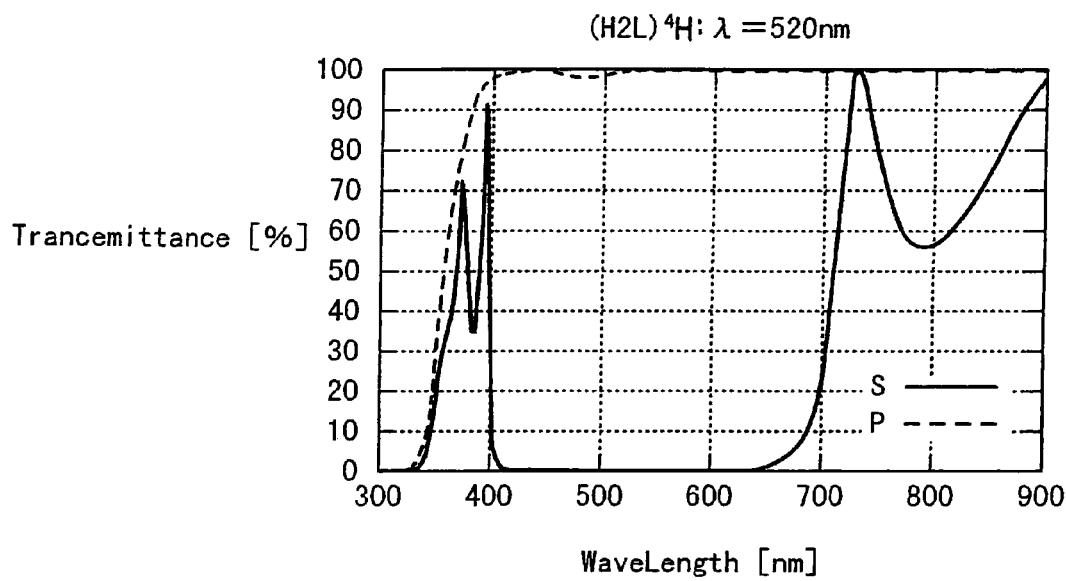
FIG. 17 is a characteristic curve illustrating distribution of the transmittance with respect to the wavelength in the case where the optical film thickness of each layer is set to (520/4) nm in an $(H2L)^4H$ structure.
Figure 18:
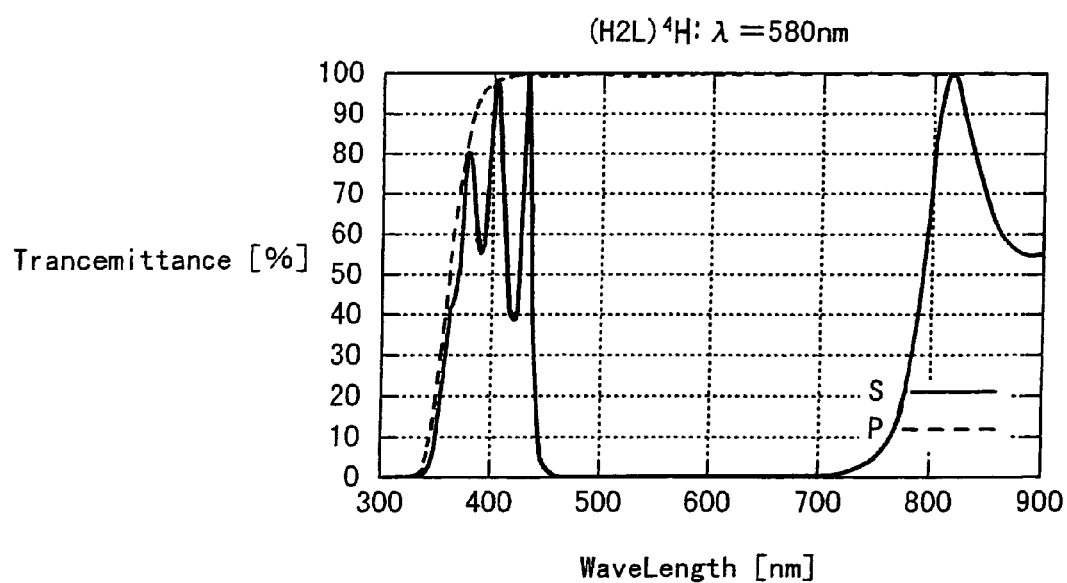
FIG. 18 is a characteristic curve illustrating distribution of the transmittance with respect to the wavelength in the case where the optical film thickness of each layer is set to (580/4) nm in the $(H2L)^4H$ structure.

In the case where in the nine-layer structure of $(H2L)^4H$ the center wavelength λ is set to 520 nm, namely the optical film thickness of each of the respective layers H, L of the polarized light beam separation film is made to be (520/4) nm, distribution of the transmittance with respect to the wavelength is illustrated in FIG. 17. Also, in the case where the center wavelength λ is set to 580 nm, namely the optical film thickness of each of the respective layers H, L of the polarized light beam separation film is made to be (580/4) nm, distribution of the transmittance with respect to the wavelength is illustrated in FIG. 18.

Furthermore, by minutely varying the film thickness of the high refractive-index layer H and that of the low refractive-index layer L, it is also possible to control the dependency upon the wavelength of the polarized light beam separation characteristics.

Basically, when the film thickness is made thinner, the characteristics are shifted to the short wavelength side, whereas, when the film thickness is made thicker, the characteristics are shifted to the long wavelength side.

Figure 19A:
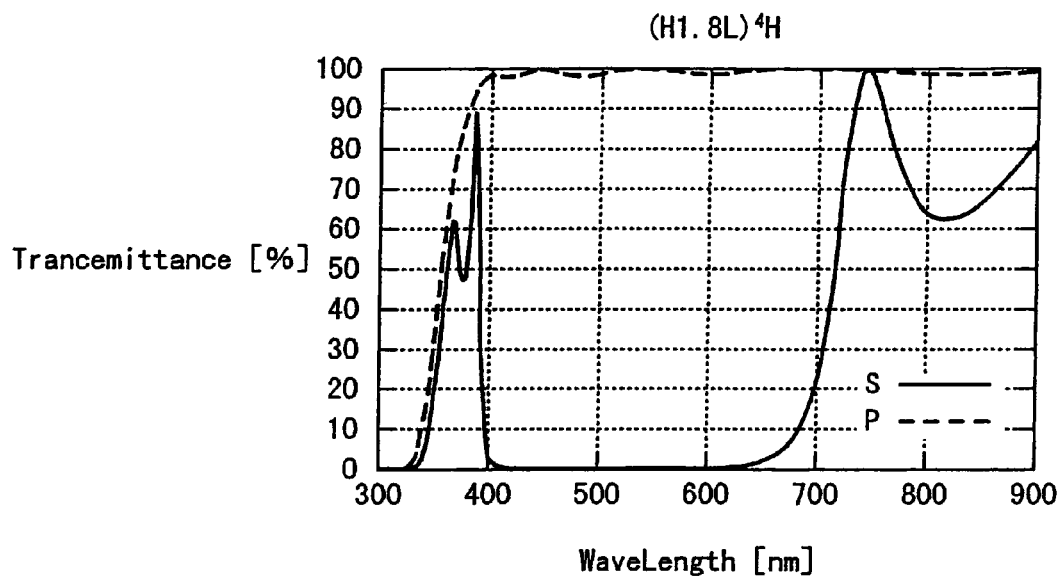
FIG. 19A is a characteristic curve illustrating distribution of the transmittance with respect to the wavelength in an $(H1.8L)^4H$ structure.
Figure 19B:
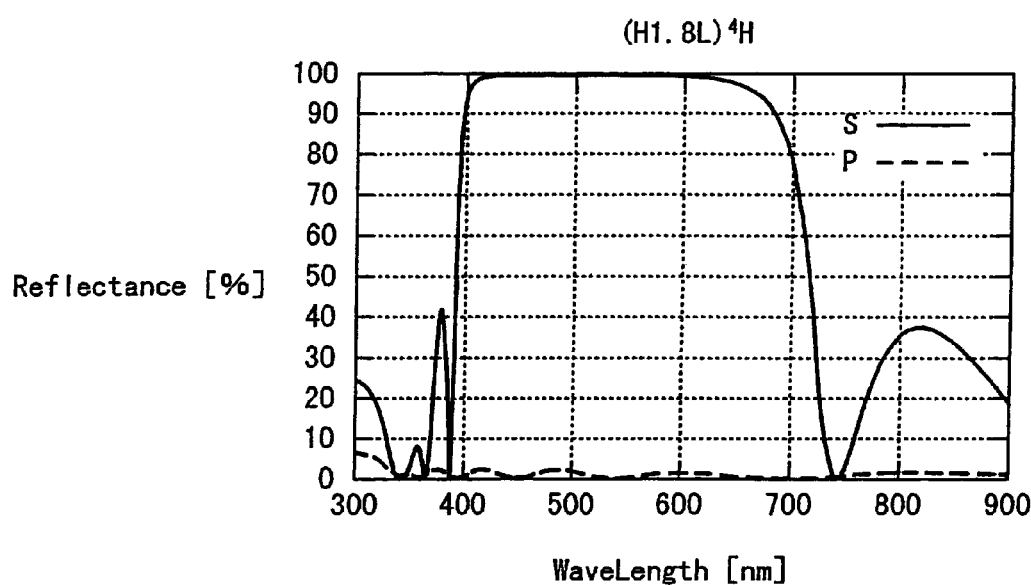
FIG. 19B is a characteristic curve illustrating distribution of the reflectance with respect to the wavelength in the $(H1.8L)^4H$ structure.
Figure 20A:
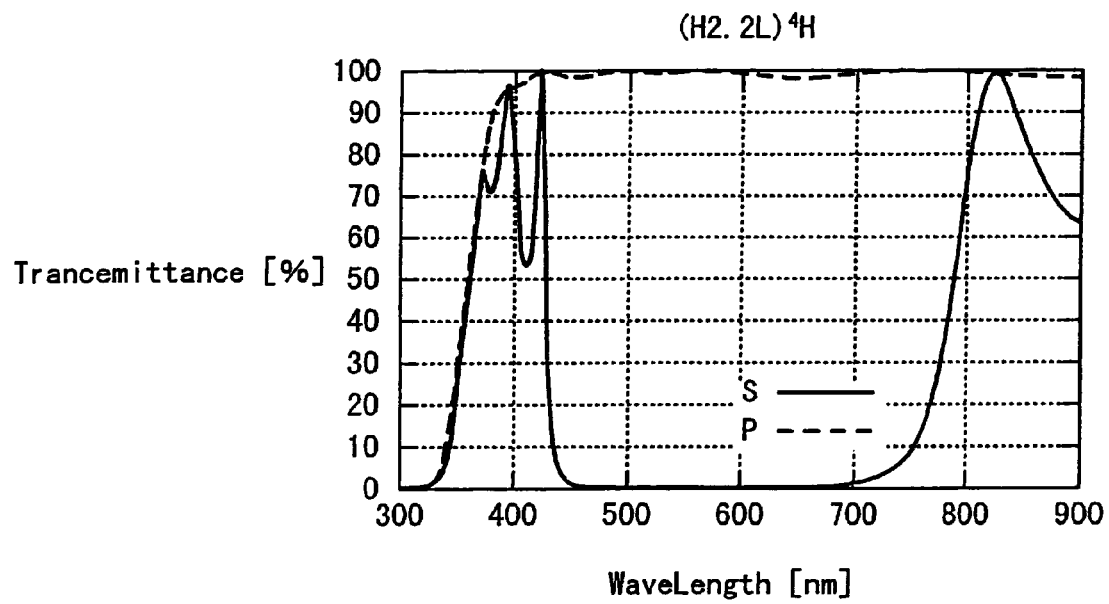
FIG. 20A is a characteristic curve illustrating distribution of the transmittance with respect to the wavelength in an $(H2.2L)^4H$ structure.
Figure 20B:
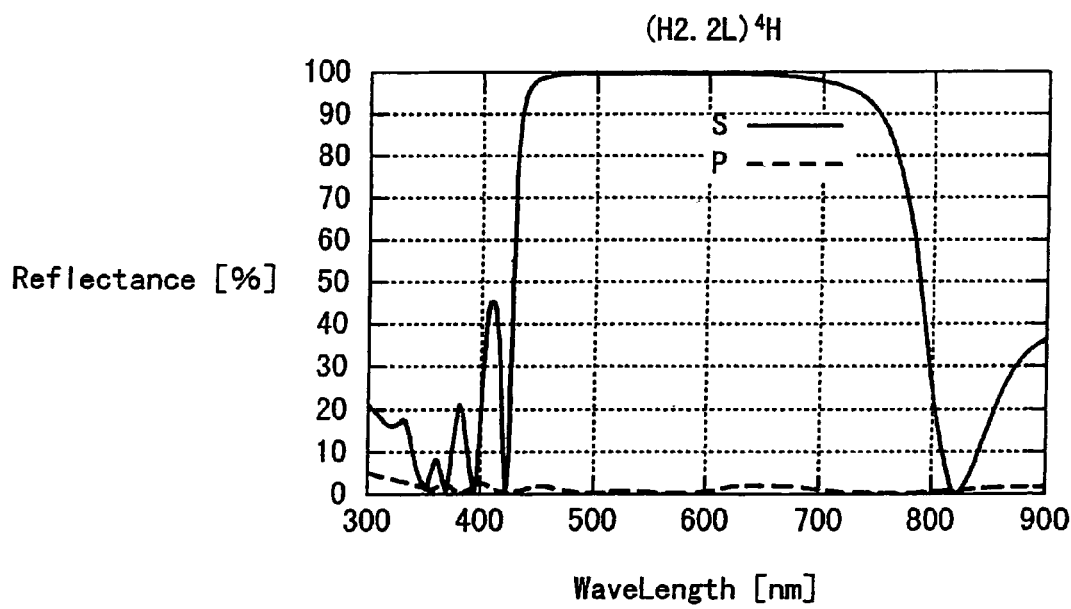
FIG. 20B is a characteristic curve illustrating distribution of the reflectance with respect to the wavelength in the $(H2.2L)^4H$ structure.

For example, distributions of the transmittance and reflectance with respect to the wavelength in the case where in the nine-layer structure of $(H2L)^4H$ the 2L is replaced with 1.8L are illustrated in FIGS. 19A and 19B, and those in the case where the 2L is similarly replaced with 2.2L are illustrated in FIGS. 20A and 20B.

Incidentally, although when the amount of variation in the film thickness is made large, the amount of shift of the wavelength range in which the polarized light beam separation can be made also becomes large, the width of the wavelength range in which the polarized light beam separation can be made tends to become narrow.

For example, although, by simultaneously varying the film thickness of H and L, it is possible to obtain characteristics similar to those obtainable in the case where H2L is the basic structure, the construction becomes complex and therefore it is not advisable.

Hereupon, any one of the data samples illustrated in FIGS. 3 to 20 is the one that has been determined by calculations under the assumption that $SiO_2$ is used as the material of the low refractive-index layer L and $TiO_2$ is used as the material of the high refractive-index layer H. However, even when the polarized light beam separation film 2 is constructed by employing the other above-described various kinds of combinations of the high refractive-index material and low refractive-index material, the resulting data have a similar tendency.

Figure 21A:
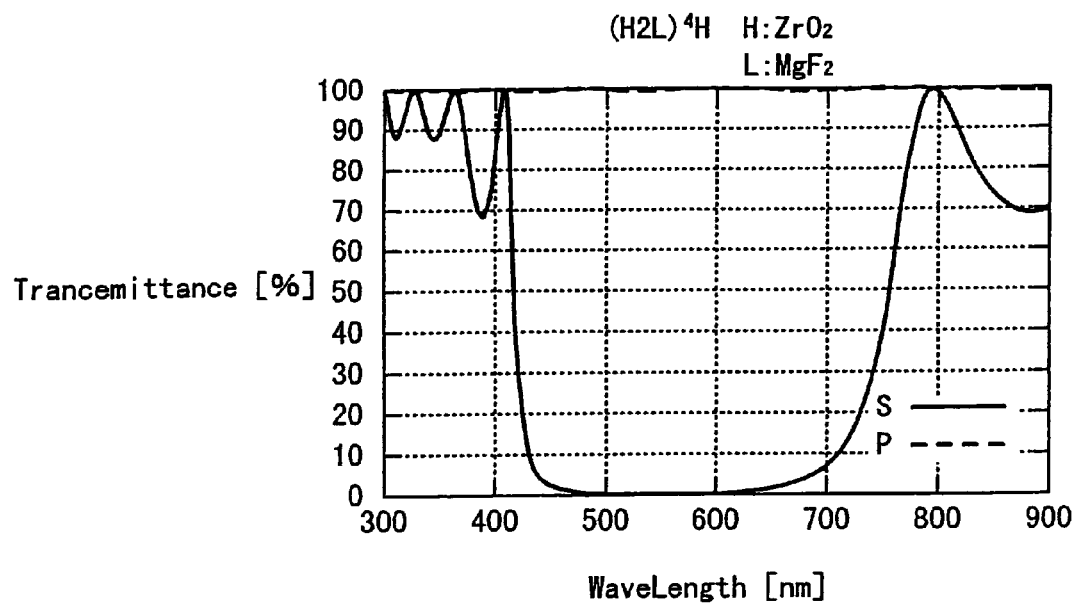
Figure 21B:
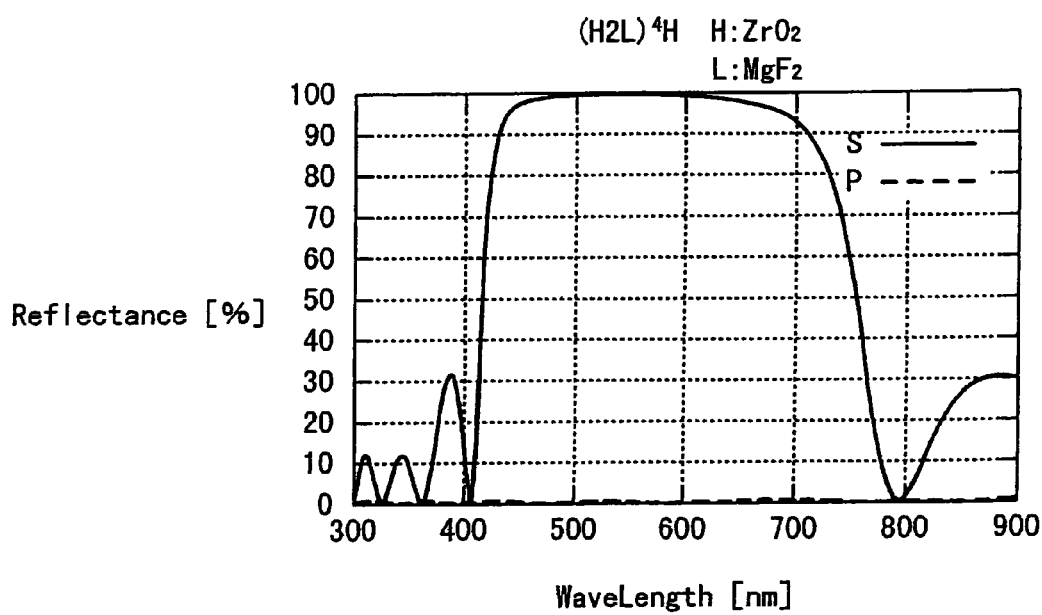
FIG. 21B is a characteristic curve illustrating distribution of the reflectance with respect to the wavelength.

Here, distributions of the transmittance and reflectance with respect to the wavelength in the case where $MgF_2$ is used as the material for the low refractive-index layer L and $ZrO_2$ is used as the material for the high refractive-index layer H to construct a nine-layer structure of $(H2L)^4H$ are illustrated in FIGS. 21A and 21B.

In the above combination of materials, when the refractive index of the transparent substrate is 1.52, the optimum angle of incidence is approximately 50 degrees, whereas, when the refractive index of the transparent substrate is 1.62, the optimum angle of incidence is 45 degrees.

As described above, the construction in which H2L constitutes a basic structure of film is suitable for the polarized light beam separation film, and therefore by suitably combining the film materials, a refractive index of the transparent substrate can be adjusted to obtain an angle of incidence at 45 degrees, and the band for the polarized light beam separation can be broadened.

Subsequently, a specific embodiment of the present invention will be explained.

FIG. 1 is a schematic construction view (an enlarged view in the proximity of a polarized light beam separation film) of a polarizing beam splitter according to an embodiment of the present invention.

A polarizing beam splitter 1 is constructed by disposing transparent substrates 3 (3A, 3B) on both sides, i.e. light-entering surface 2A side and light outgoing surface side 2B of a polarized light beam separation film 2, respectively.

The polarized light beam separation film 2 is constructed of an $(H2L)^m$ structure that includes a repeated structure $(H2L)^m$ (m is an integer 3 or more) formed of the above-described basic structure film H2L consisting of the low refractive-index layer L and high refractive-index film H. That is, the polarized light beam separation film 2 has any structure among the above-described $(H2L)^m$, $2L(H2L)^m$, and $(H2L)^mH$.

As the low refractive index material constituting the low refractive-index layer L, for example, $SiO_2$ (n=1.454 to 1.493), $MgF_2$ (n=1.38), LiF (n=1.4), $AlF_3$ (n=1.4) $Na_3AlF_6$ (n=1.33), or the like can be used.

As the high refractive index material constituting the high refractive-index layer H, for example, $TiO_2$ (n=2.35 to 2.8), $Nb_2O_5$ (n=2.32), ITO (n=1.9), ZnO (n=1.9), $CeO_2$ (n=1.95), $SnO_2$ (n=1.95), $Al_2O_3$ (n=1.63), $La_2O_3$ (n=1.95), $ZrO_2$ (n=2.05), $Y_2O_3$ (n=1.87), or the like can be used.

As described above, the optical film thickness of each of the low refractive-index layer L and high refractive-index layer H is made to have a value approximately equal to $\lambda_0/4=137.5$ nm with respect to the reference wavelength $\lambda_0=550$ nm of the incident light L0.

Namely, in the case where, for example, $SiO_2$ (n=1.49 at the reference wavelength=$\lambda_0$) is used as the material of the low refractive-index layer L, the film thickness D1 (refer to FIG. 3) of the low refractive-index layer L is made to have a value of 92.3 nm. In the case where, for example, $TiO_2$ (n=2.40 at the reference wavelength=$\lambda_0$) as the material of the high refractive-index layer H, the film thickness D0 (refer to FIG. 3) of the high refractive-index layer H is made to have a value of 57.3 nm.

At this time, the film thickness of the 2L layer is 184.6 nm, which corresponds to the doubled optical film thickness of the low refractive-index layer L.

Also, the repetition number m of the basic structure film H2L is made to be an integer that is 3 or more, preferably from 3 to 7.

Figure 2:
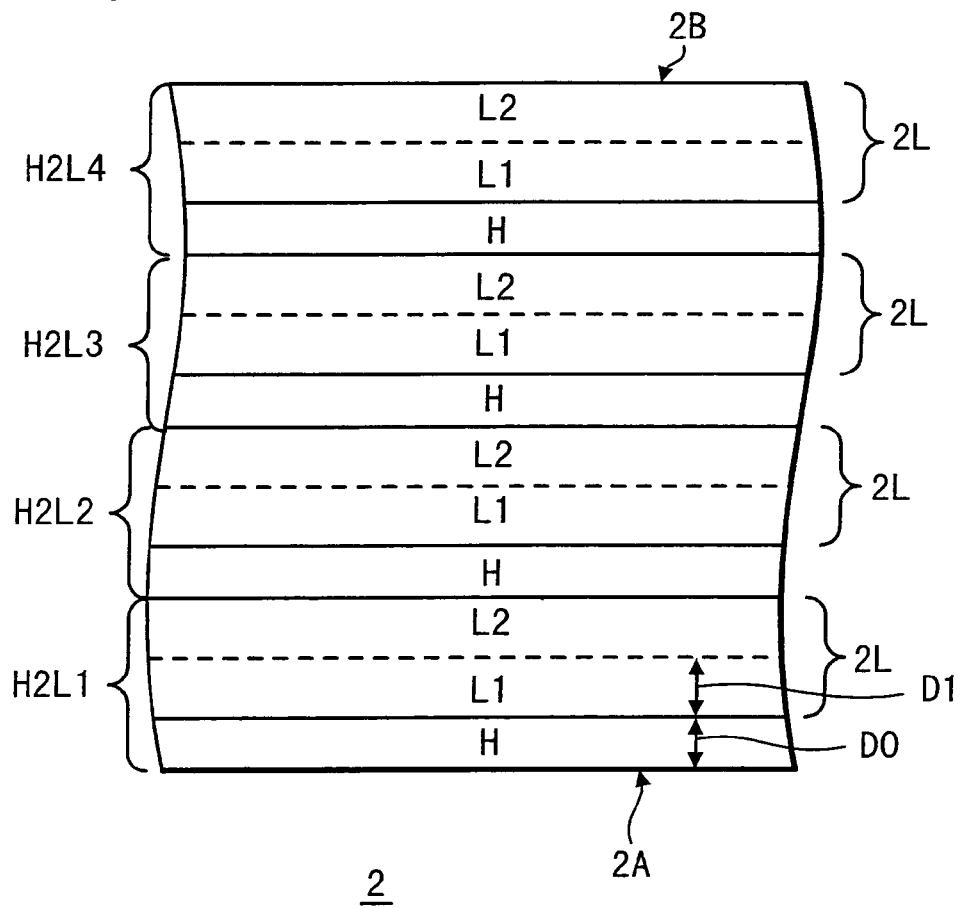
FIG. 2 is a construction view of the polarized light beam separation film of FIG. 1 in the case where the number of repetitions of a basic structure film has been set to four.

The construction of the polarized light beam separation film 2 in the case where, among those resulting structures, the repetition number m of the basic structure film H2L has been made 4 to provide a $(H2L)^4$ structure is illustrated in FIG. 2.

Then, there is the tendency that, the greater the difference between the refractive index of the low refractive-index layer L and that of the high refractive-index layer H is, the broader the polarized light beam separation wavelength band becomes.

As illustrated in FIG. 2, this polarized light beam separation film 2 has a structure in which a basic structure consisting of a high refractive-index layer H and a low refractive-index layer 2L composed of two layers formed of a first low refractive-index layer L1 and a second low refractive-index layer L2 has been simply laminated four times repeatedly from the light-entering surface 2A side.

Namely, the structure includes from the light-entering surface 2A side a first basic structure film H2L1, a second basic structure film H2L2, a third basic structure film H2L3, and a fourth basic structure film H2L4, which are sequentially laminated in this order, and is an extremely simple structure without requiring any additional modification with respect to the basic structure.

Further, since the basic structure film H2L is laminated four times, the number of the layers becomes eight.

In the case of m=3, 5, 6, or 7, it is also possible to construct the polarized light beam separation film 2 similarly, though not illustrated.

Namely, the number M of laminated layers of the polarized light beam separation film 2 is given as M=2m.

Further, even in the case where the 2L(H2L)$^m$ structure or (H2L)$^m$H structure is adopted as the polarized light beam separation film 2, it is also possible to construct the polarized light beam separation film 2 by laminating the low refractive-index layer L and the high refractive-index layer H. In each of those structures, the number M of laminated layers in the polarized light beam separation film is M=2m+1.

In the polarizing beam splitter 1 having a construction illustrated in FIG. 1, a polarized light is divided as follows.

An incident light L0 containing a first polarized light beam (for example, a P-polarized light) and a second polarized light (for example an S-polarized light) is propagated within the transparent substrate 3A, and then arrives at the light-entering surface 2A of the polarized light beam separation film 2 and is incident upon the light-entering surface 2A at a predetermined angle θ of incidence.

The light entered the polarized light beam separation film 2 is propagated through the inside of the polarized light beam separation film 2.

The first polarized light L1 goes straightforward through the polarized light beam separation film 2 and goes out from the light outgoing surface 2B, and further the light L1 is propagated through the transparent substrate 2B and goes out.

The second polarized light L2 is reflected within the polarized light beam separation film 2 at a predetermined angle of degrees with respect to the propagation direction (the transmission direction), and then is propagated through the transparent substrate 3A to goes out.

It should be noted that the second polarized light L2 is reflected by an intermediate layer of the multiple-layer film having the construction illustrated, for example, in FIG. 2, e.g. by the low refractive-index layer 2L located at the boundary between the second basic structure film H2L2 and the third basic structure film H2L3.

In this embodiment, in the case where SiO$_2$ is used as the material of the low refractive-index layer L, for example, and TiO$_2$ as the material of the high refractive-index layer H, for example, further when each of the refractive indexes of the transparent substrates 3A and 3B is constructed to be 1.8, the optimum polarized light beam separation characteristic is obtained when the angle of incidence of the incident light L0 is set as θ=45 degrees. In the case where, for example, Nb$_2$O$_5$ is used as the material of the high refractive-index layer H instead of TiO$_2$, the same result will also be obtained.

According to the above-described embodiment, since the polarized light beam separation film 2 is constructed of the (H2L)$^m$ structure in which H2L is employed as the basic structure film, the polarized light beam separation film can be formed with a simple construction.

In addition, since the repetition number m is selected from 3 to 7, it is possible to make the number M of laminated layers (M=2m or 2m+1) as small as 6 to 15.

Accordingly, owing to the simple film construction and small number M of the laminated-layers, it becomes possible to execute the film-forming process much more easily compared with that of a conventional separation film and, and further to fabricate the polarized light beam separation film 2 having high performance. As a result, it becomes possible to provide a polarizing beam splitter that is low in cost and high in performance.

Also, in the case where, for example, SiO$_2$ is used as the material of the low refractive-index layer L and, for example, TiO$_2$ or Nb$_2$O$_5$ is used as the material of the high refractive-index layer H, by further using a glass having a refractive index of n=1.8 as the transparent substrates 3A and 3B, it is possible to obtain an optimum polarized light beam separation characteristic at the angle of incidence of about 45 degrees.

Accordingly, it is possible to construct the polarizing beam splitter 1 that is compatible with a conventional polarizing beam splitter.

Further, it is preferable that each optical film thickness of the high refractive-index layer H and low refractive-index layer L be set to $\lambda_0/4$ (the optical film thickness of the 2L layer portion be set to $\lambda_0/2$); and the refractive index be set to n=1.8.

However, if favorable polarized light beam separation characteristics are obtained over a wide range of wavelength, the optical film thickness and refractive index may be deviated from those values $\lambda_0/4$ and 1.8, respectively) to some degree.

Although in the above-described embodiment an explanation has been given of the case where TiO$_2$ has been used as the material of the high refractive-index layer H and SiO$_2$ has been used as the material of the low refractive-index layer L, and at this time each refractive index of the transparent substrates 3A and 3B has been made 1.8, in the present invention the combination of those high refractive-index layer H, low refractive-index layer L and each refractive index of the transparent substrates holding the polarized light beam separation film therebetween may have other constructions.

Further, in the present invention, corresponding to the combination of the materials of the high refractive-index layer H and low refractive-index layer L, the transparent material having an appropriate refractive index for the transparent substrates which hold the polarized light beam separation film is selected, so that it is possible to design a polarizing beam splitter corresponding to a given angle of incidence.

Furthermore, it is possible to construct a polarizer for arranging natural light into a specific polarized state by being provided with the polarizing beam splitter of the present invention.

Figure 22:
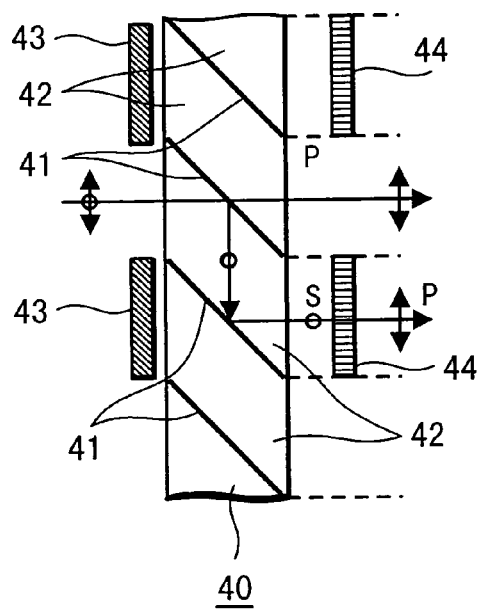
FIG. 22 is a schematic construction view of a conventional polarizer.

Here, the construction of a conventional polarizer (polarized light beam separation/conversion prism) is illustrated in FIG. 22.

A polarizer 40 has a structure of the cross section in which a polarized light beam separation film 41 is held from both sides by transparent substrates 42 such that the angle of incidence of a light beam becomes 45 degrees. Specifically, the polarizer is formed in such a manner as to form the thin-film laminated polarized light beam separation film 41 onto the transparent substrate 42 composed of glass, and by laminating a necessary number of the separation films 41 to be bonded to the transparent substrate 42, and the laminated structure is obliquely cut out at an angle of 45 degrees.

Also, light-shielding masks 43 are disposed partially on the left side where light is incident, while ½ wavelength plates 44 are disposed partially on the right side where light goes out. Those light-shielding masks 43 and ½ wavelength plates 44 are periodically disposed corresponding to the repetition of transparent substrates 42 and the laminated layers of polarized light beam separation films 41.

This polarizer 40 functions as follows.

The polarized light beam separation film 41 functions as a mirror with respect to the S-polarized light, and transmits the P-polarized light therethrough as it is.

By this, the P-polarized light component of the light entered the polarized light beam separation film 41 is first separated, and the remaining S-polarized light component is reflected twice by the polarized light beam separation films 41 and then goes out.

Here, since the light-shielding masks 43 are periodically disposed on the left side where light enters, the P-polarized light component is prevented from entering the region from which the S-polarized light goes out by reflections.

Also, since the P-polarized light and S-polarized light alternately appear on the light outgoing surface, there is the need to arrange the polarized state. By periodically disposing the ½ wavelength plates ($\lambda/2$ plates) 44 that are phase plates causing a 90-degree change in the direction of the polarized light, only either of the polarized light beams (the S-polarized light in FIG. 22) is caused to pass through the ½ wavelength plate 44 to change the direction of the polarized light at an angle of 90 degrees, and thus the polarized state can be arranged into a P-polarized state.

Here, as an embodiment of the polarizer (polarized light beam separation/conversion prism) of the present invention, a case where the present invention has been applied to the polarizer 40 illustrated in FIG. 22 will be explained.

Here, the polarized light beam separation film 41 of the polarizer 40 is constructed of a multiple-layer film consisting of the $(H2L)^m$ structure that includes the $(H2L)^m$ that is a repeated structure of the above-described basic structure film H2L. Namely, the polarizer 40 is constructed by being provided with the construction of the above-described polarizing beam splitter of the present invention.

As described above, since the polarizer 40 is constructed by being provided with the construction of the above-described polarizing beam splitter of the present invention, sufficient qualities of polarized light beam separation characteristics are obtained over a wide range of wavelength, thereby enabling natural light to be efficiently arranged into a specific polarized state.

In addition, since the polarized light beam separation film 41 becomes simple in film structure and small in the number of laminated layers, it is possible to obtain the polarizer 40 that is inexpensive and high in performance.

The present invention is not limited to the above-described embodiments and various modified constructions can be adopted without departing from the gist of the present invention.

According to the above-described polarizing beam splitter of the present invention, it is possible to obtain an inexpensive polarizing beam splitter having a function of a polarized light beam separation in a wide-band because of the simple film construction and a smaller number of the laminated layers.

Further, according to the polarizing beam splitter of the present invention, since it becomes possible to obtain optimum polarized light beam separation characteristics at the angle of incidence of about 45 degrees, the construction thereof can be made compatible with the conventional polarizing beam splitter.

Furthermore, according to the polarizer of the present invention, since the polarizer comprises the construction of the above-described polarizing beam splitter of the present invention to have a wide-band polarized light beam separation function, natural light can be efficiently arranged into a specific polarized state. Thus, it is possible to obtain an inexpensive and high-performance polarizer.

What is claimed is:

1. A polarizing beam splitter in which a first polarized light beam of light incident at a predetermined angle is transmitted and a second polarized light beam of the incident light is reflected in a direction different from the direction in which said first polarized light beam is transmitted, comprising:

a polarized light beam separation film composed of a multiple-layer film which includes a basic structure film H2L consisting of an optically transparent high refractive-index layer H having a predetermined refractive index with respect to said incident light and an optically transparent low refractive-index layer 2L having a refractive index lower than that of said high refractive-index layer H, and consists of any structure among $(H2L)^m$, $(H2L)^m H$, and $2L(H2L)^m$ (where m is an integer 3 to 7), each of which is a repeated structure of said basic structure film, in which a reference wavelength ($\lambda_0$) is equal to approximately 550 nm, and said high refractive-index layer H has a thickness approximately equal to $\lambda_0/4$ and said low refractive-index layer 2L has a thickness approximately equal to $\lambda_0/2$; and transparent substrates disposed on the light-entering surface side and on the light-outgoing surface side of said polarized light beam separation film, respectively.

2. A polarizing beam splitter according to claim 1 wherein, the refractive index of said transparent substrate on said light-entering surface side and the refractive index of said transparent substrate on said light-outgoing surface side are selected such that when the angle of incidence of said incident light upon said polarized light beam separation film is 45 degrees, sufficient polarization and separation can be performed.

3. A polarizing beam splitter according to claim 1, wherein said high refractive-index layer H is formed of $TiO_2$ or $Nb_2O_5$, said low refractive-index layer 2L is formed of $SiO_2$, and the refractive index of said transparent substrate on the light-entering surface side and the refractive index of said transparent substrate on the light-outgoing surface side are both set to approximately from 1.75 to 1.8.

4. A polarizer comprising:

a polarizing beam splitter in which a first polarized light beam of light incident at a predetermined angle is transmitted and a second polarized light beam of the incident light is reflected in a direction different from the direction in which said first polarized light beam is transmitted that includes a polarized light beam separation film composed of a multiple-layer film which includes a basic structure film H2L consisting of an optically transparent high refractive-index layer H having a predetermined refractive index with respect to said incident light and an optically transparent low refractive-index layer 2L having a refractive index lower than that of said high refractive-index layer H, and consists of any structure among $(H2L)^m$, $(H2L)^m H$, and $2L(H2L)^m$ (where m is an integer 3 to 7), each of which is a repeated structure of said basic structure film, in which a reference wavelength ($\lambda_0$) is equal to approximately 550 nm, and said high refractive-index layer H has a thickness approximately equal to $\lambda_0/4$ and said low refractive-index layer 2L has a thickness approximately equal to $\lambda_0/2$; and transparent substrates disposed on the light-entering surface side and on the light-outgoing surface side of said polarized light beam separation film, respectively, wherein, said polarized light beam separation film and said transparent substrate are alternately laminated and obliquely cut out.

5. A polarizer according to claim 4, wherein said high refractive-index layer H is formed of $TiO_2$ or $Nb_2O_5$, said low refractive-index layer 2L is formed of $SiO_2$, and the refractive index of said transparent substrate on the light-entering surface side and the refractive index of said transparent substrate on the light-outgoing surface side are both set to approximately from 1.75 to 1.8.

* * * * *